Sept. 15, 1970
H. E. DURR
3,528,619
APPARATUS FOR HANDLING A PLURALITY OF
CYLINDRICAL ARTICLES, SUCH AS
REELS OF WIRE
Filed July 31, 1968
14 Sheets-Sheet 1
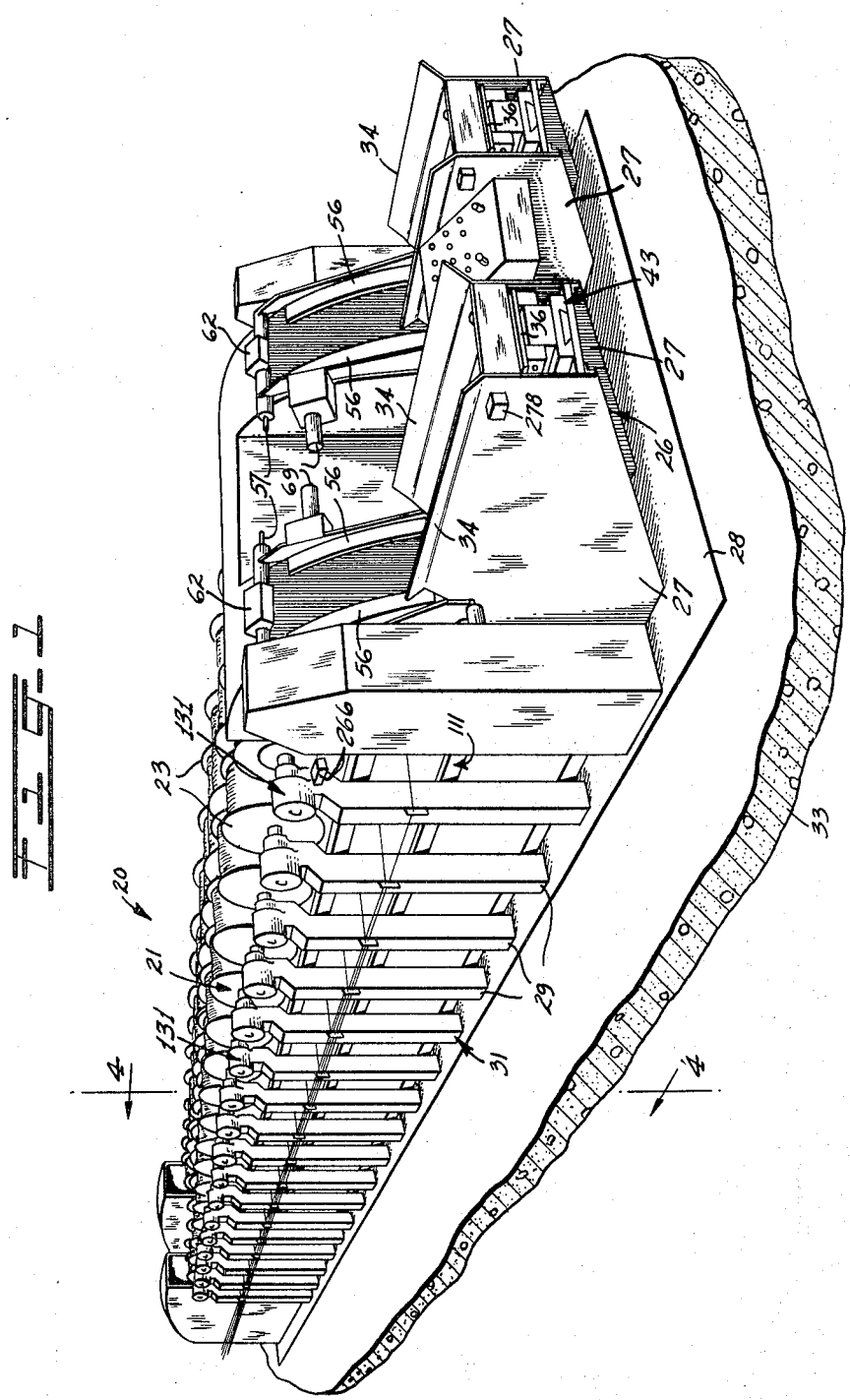
INVENTOR
H. E. DURR
By E. W. Somers
ATTORNEY

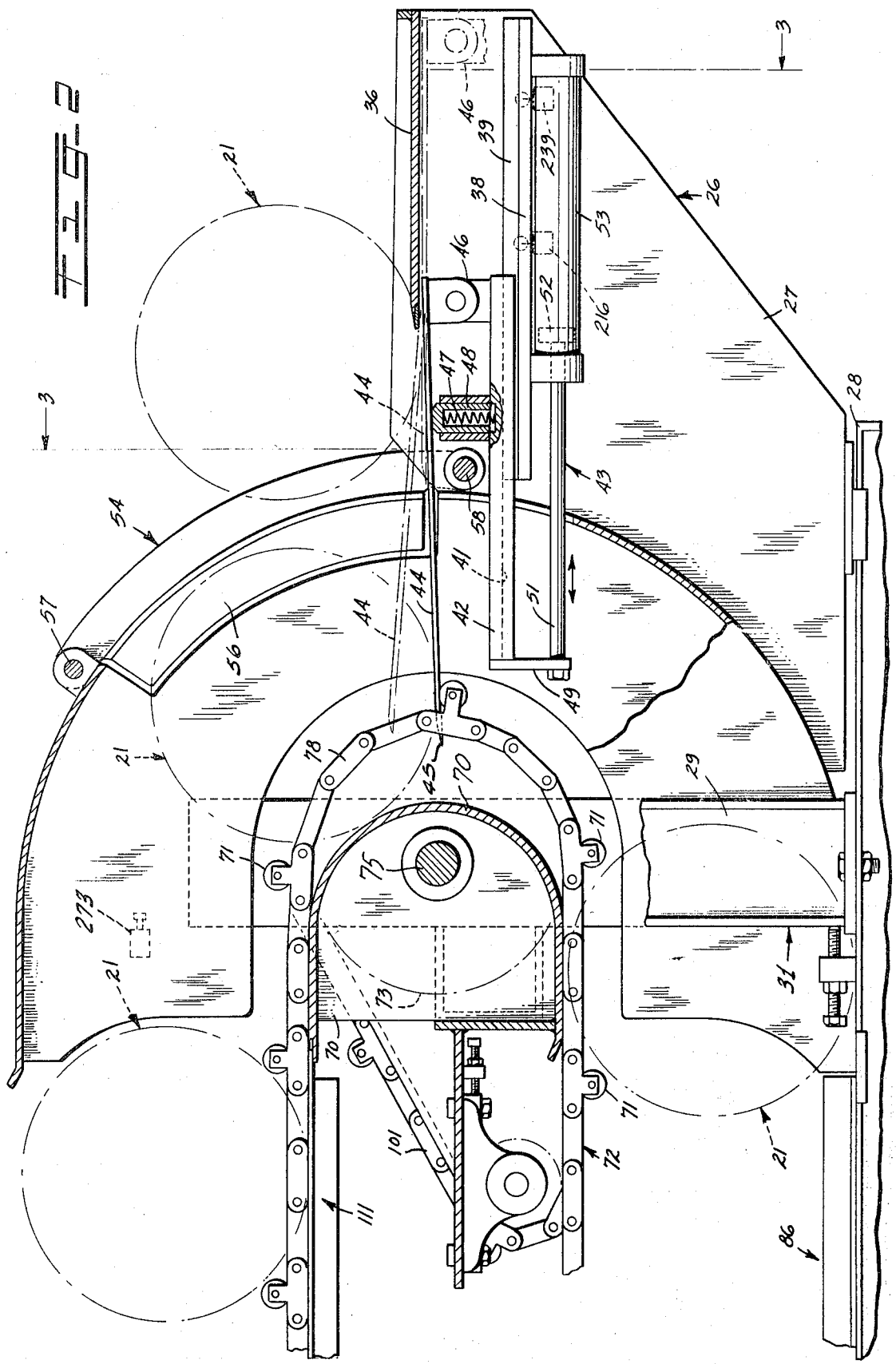

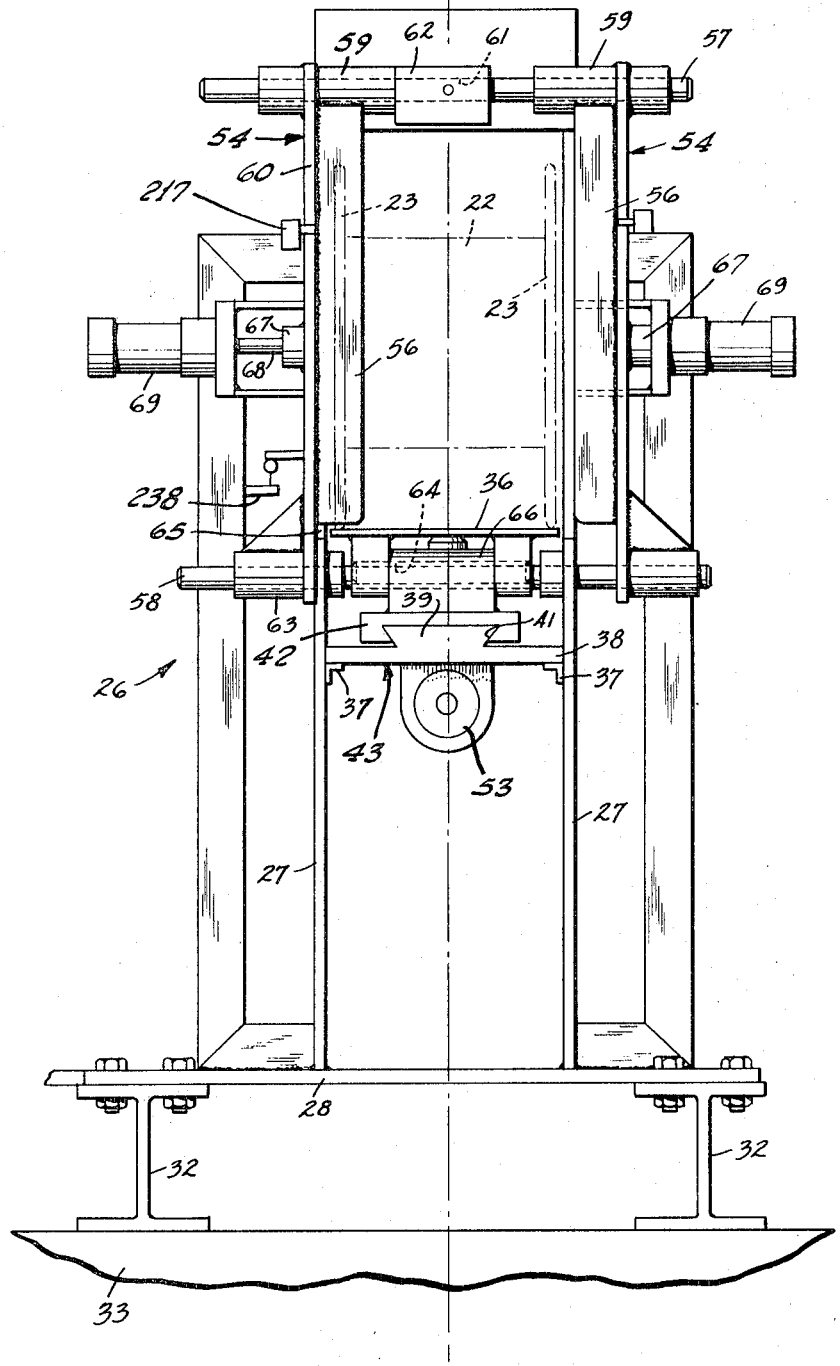

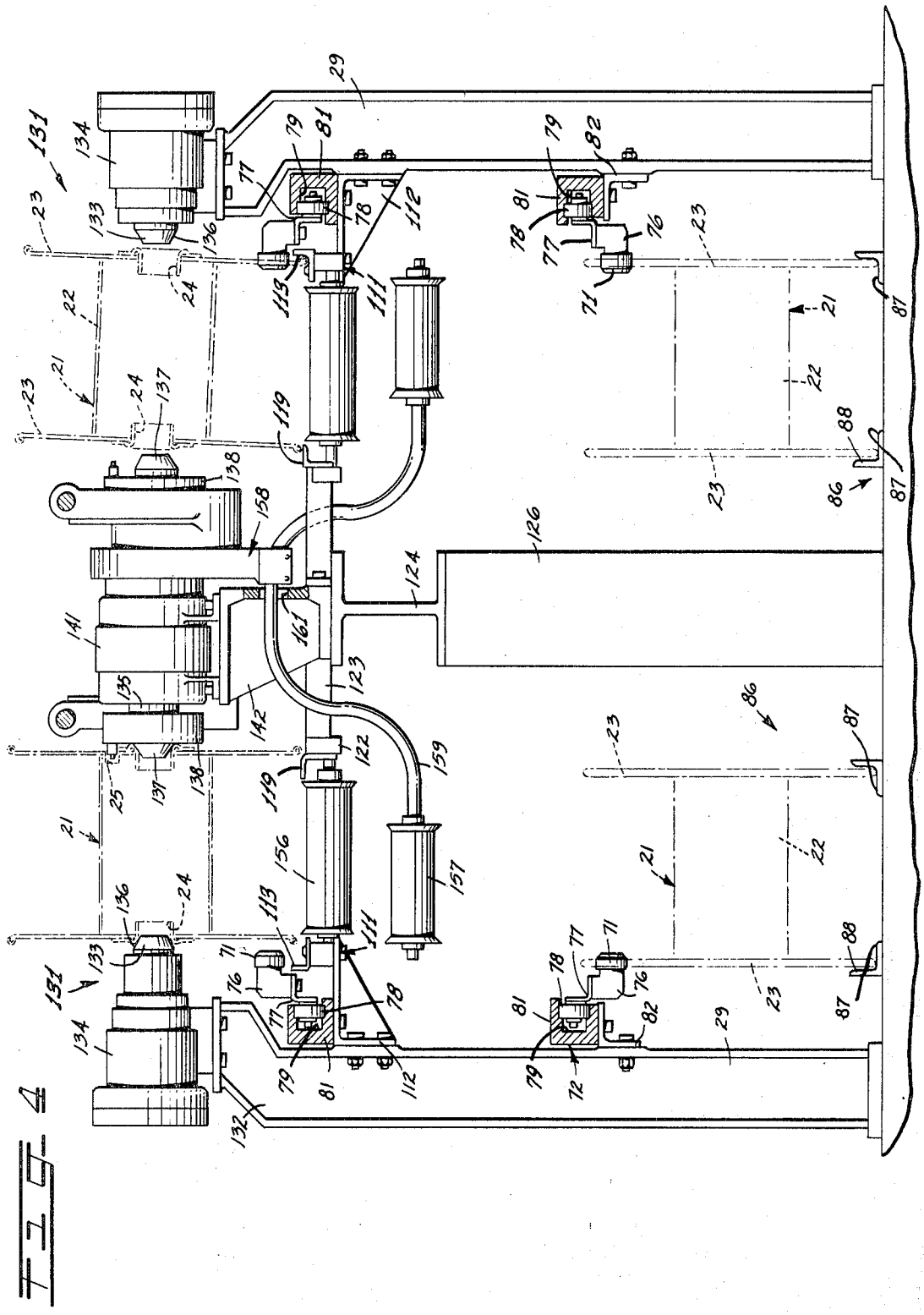

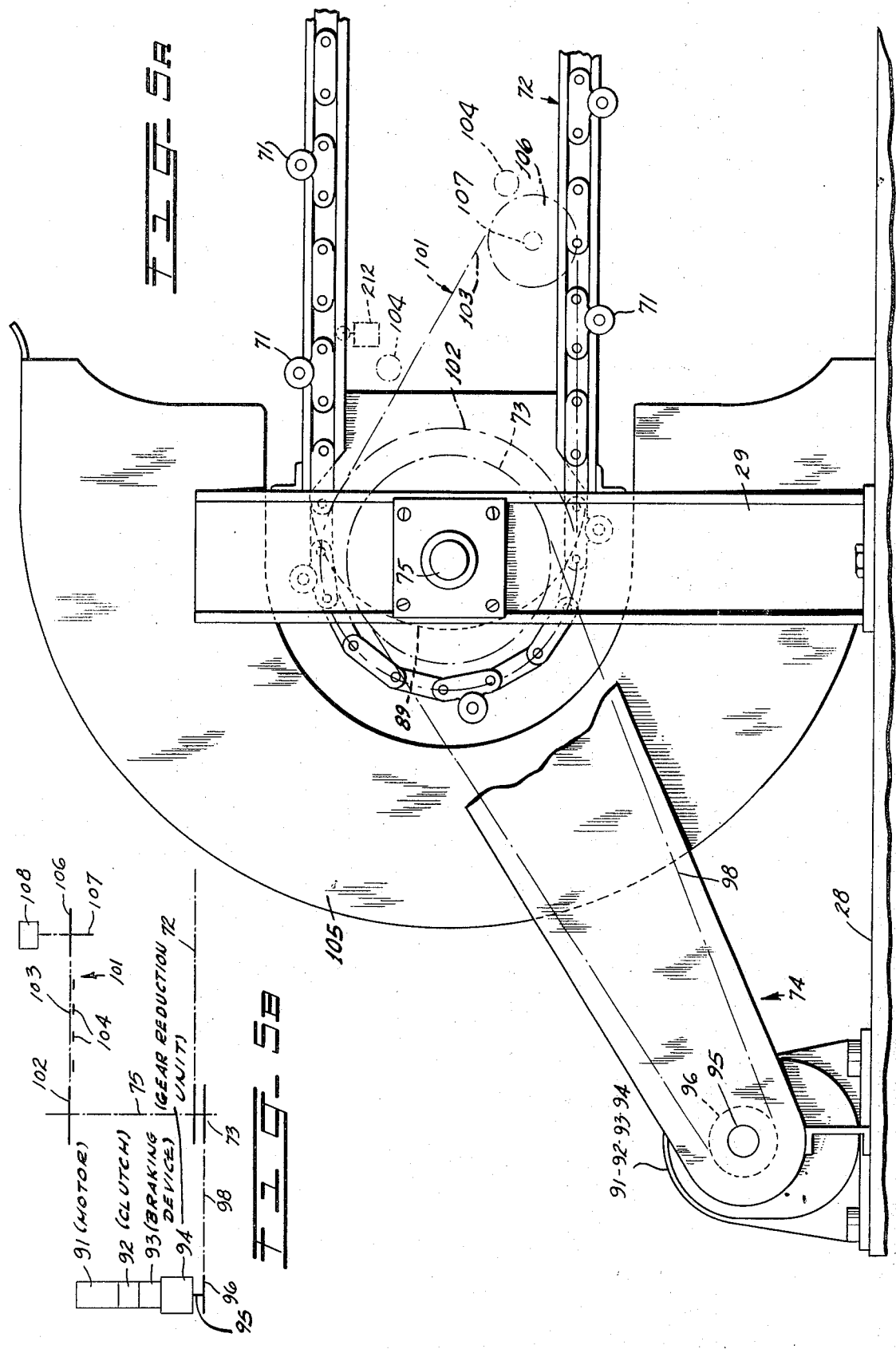

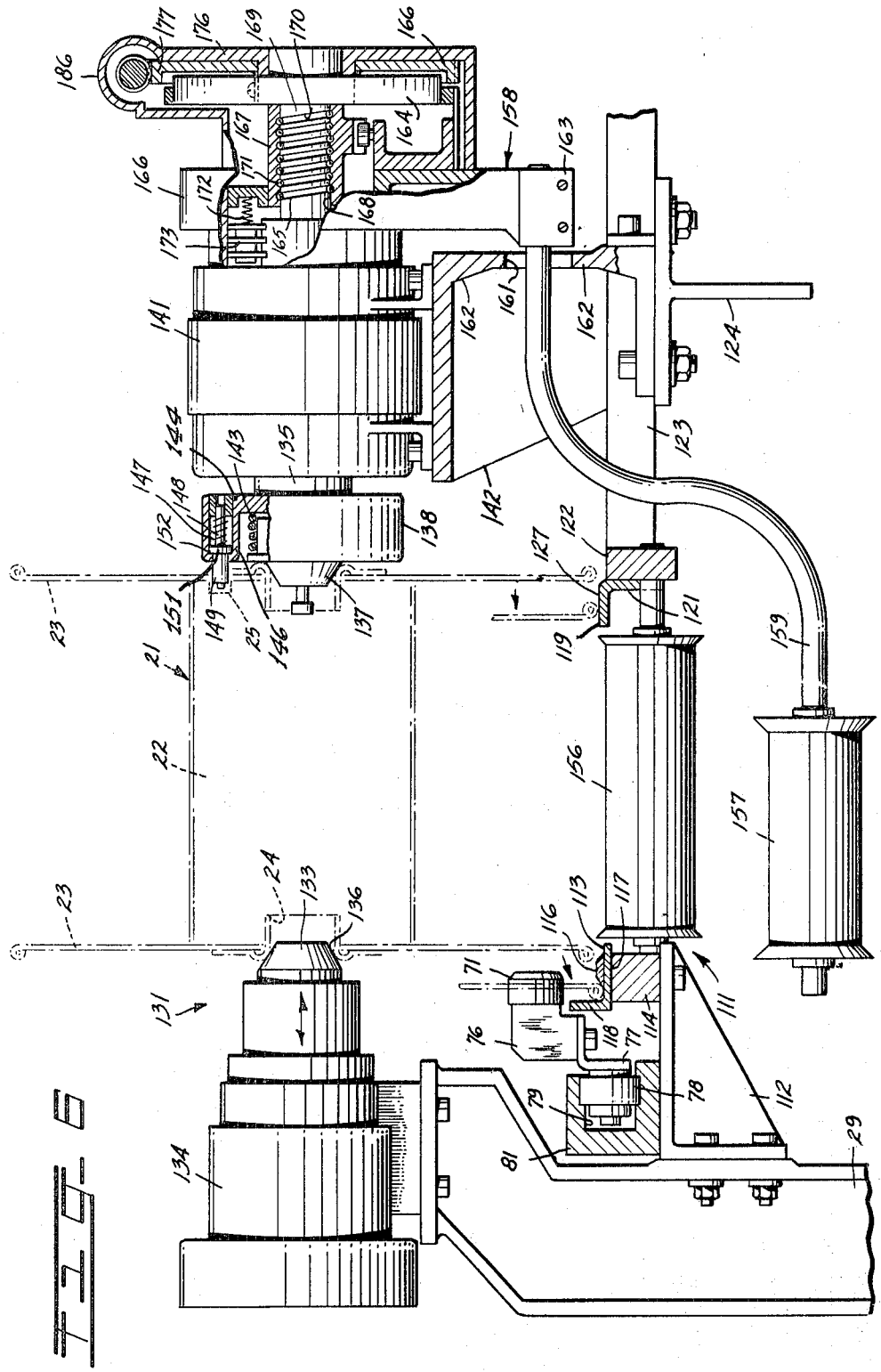

Sept. 15, 1970  H. E. DURR  3,528,619
APPARATUS FOR HANDLING A PLURALITY OF
CYLINDRICAL ARTICLES, SUCH AS
REELS OF WIRE
Filed July 31, 1968  14 Sheets-Sheet 7
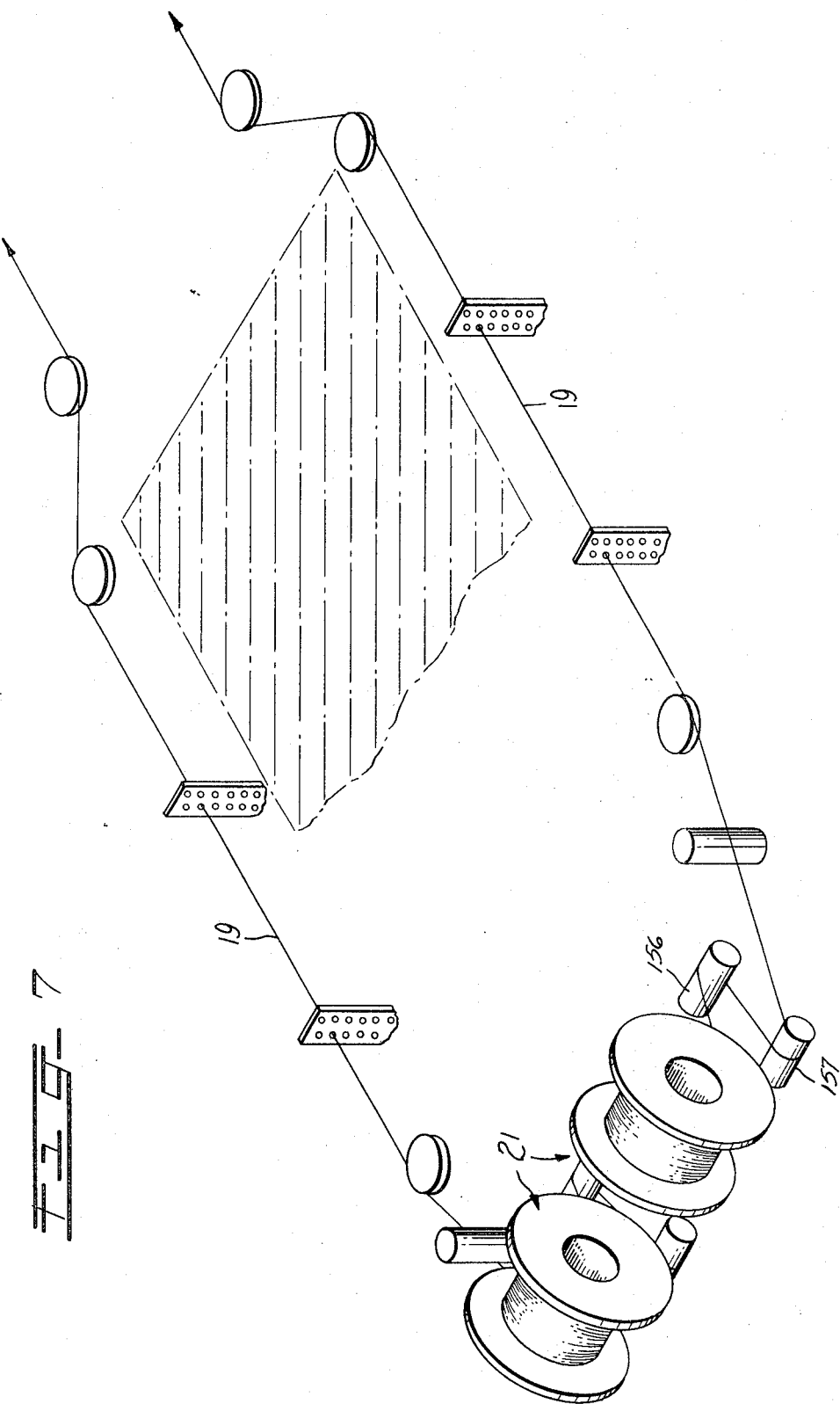

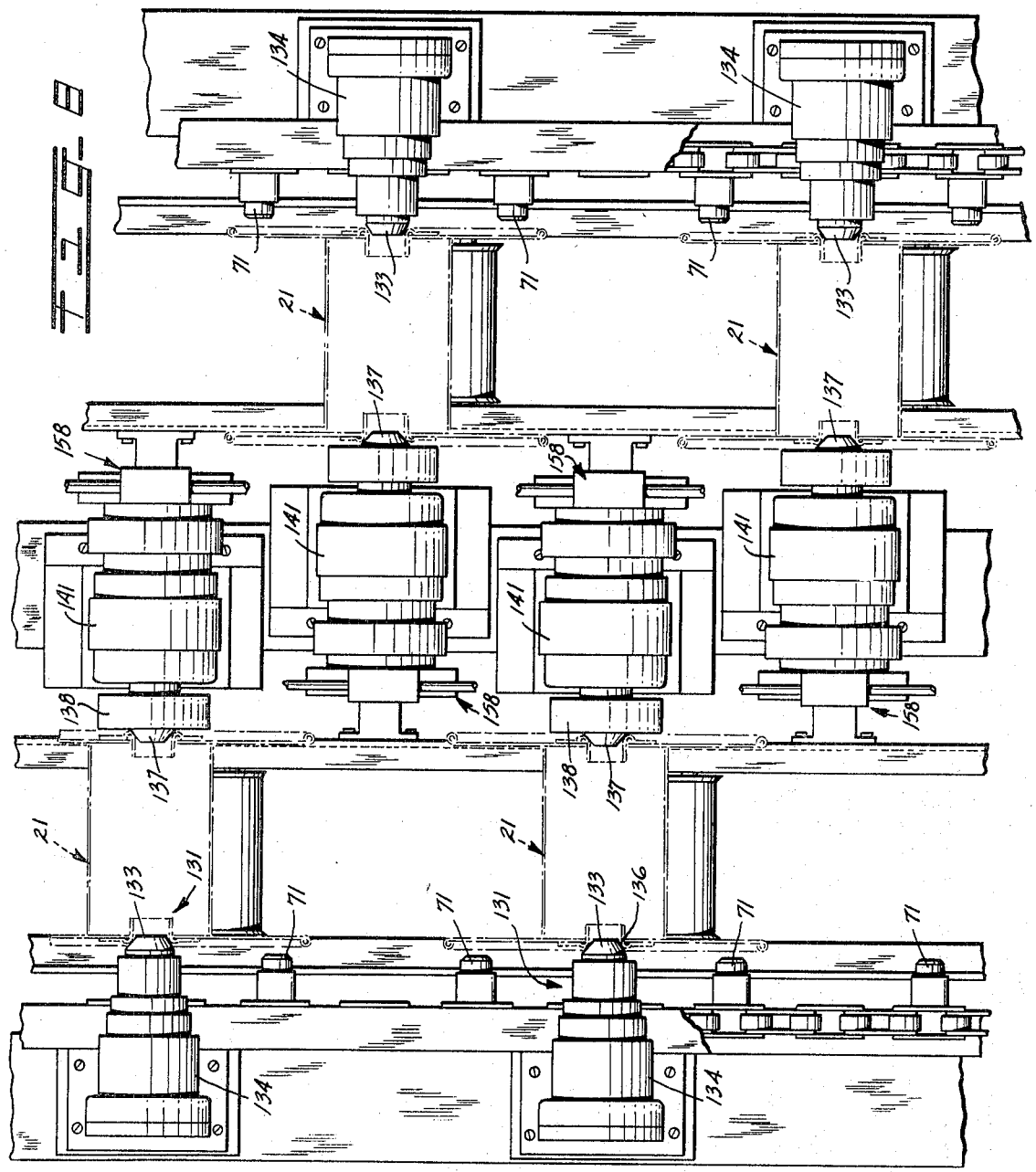

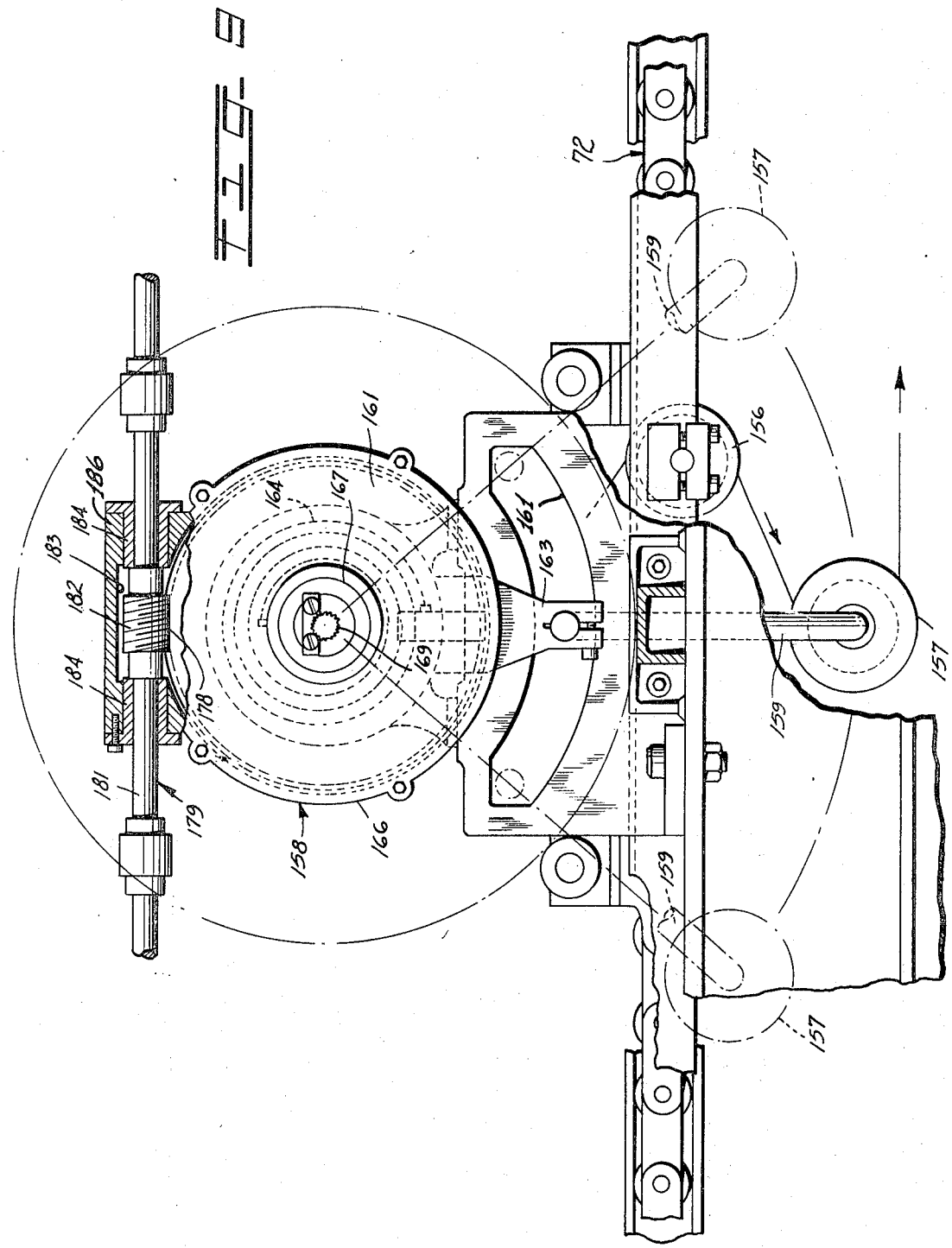

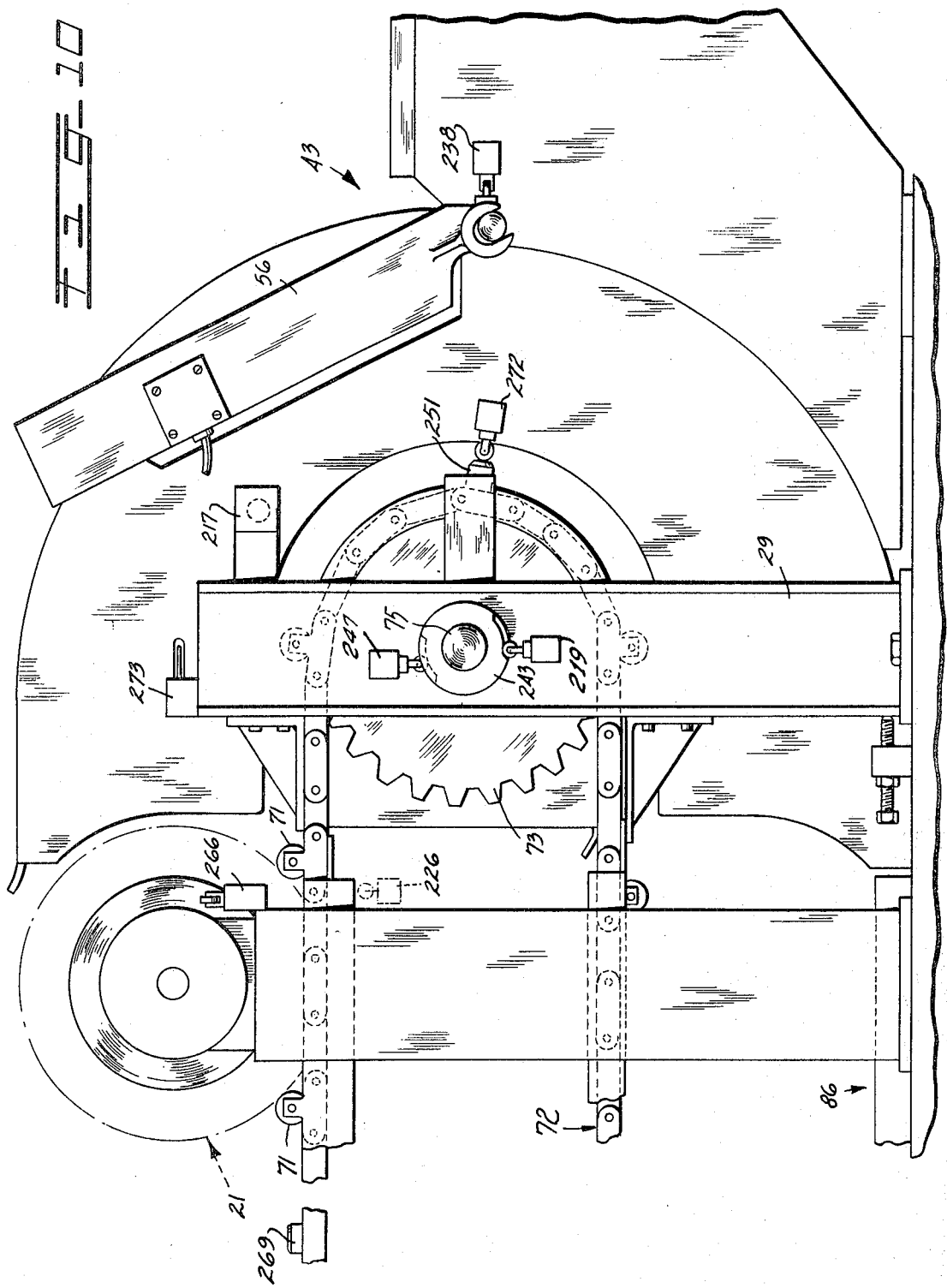

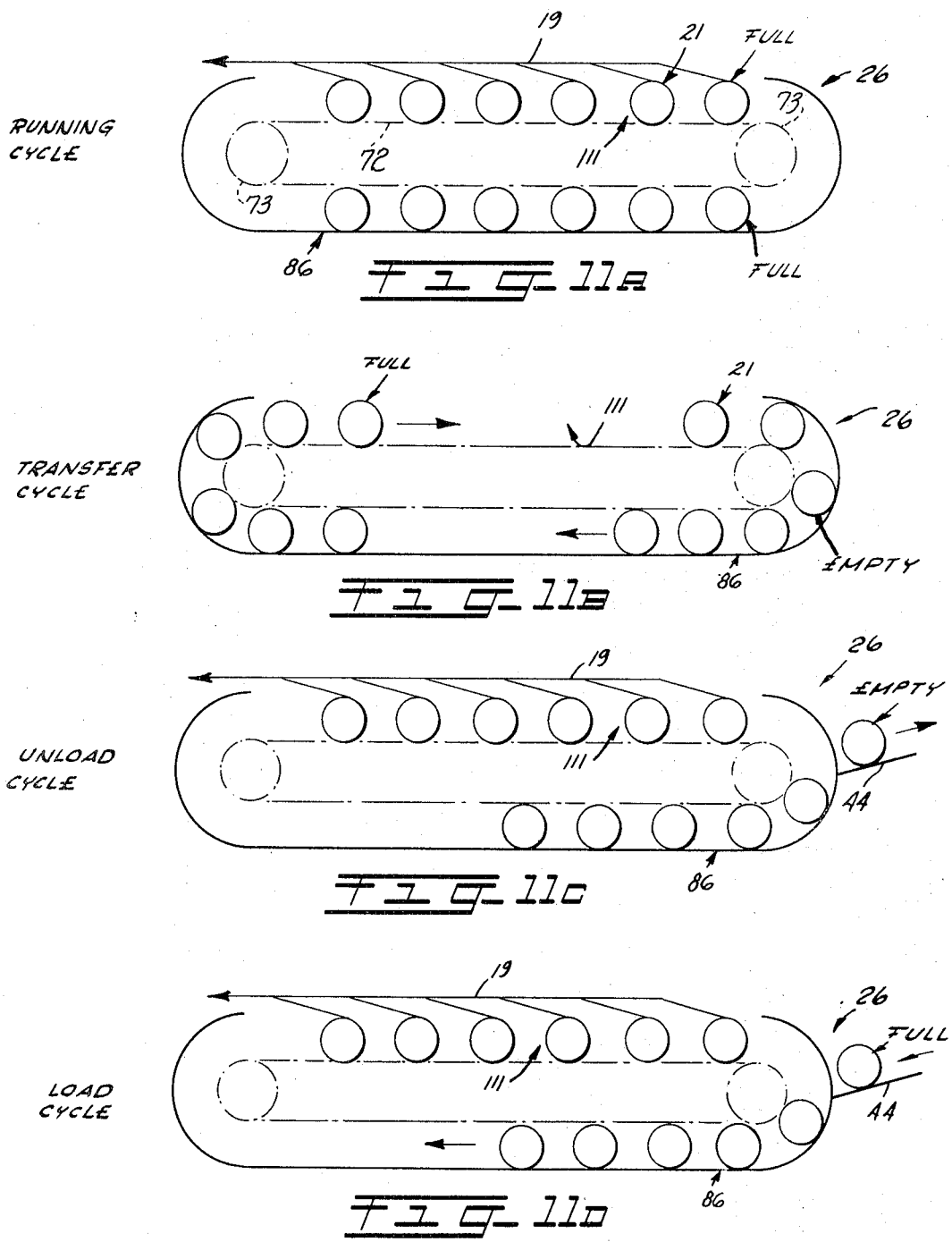

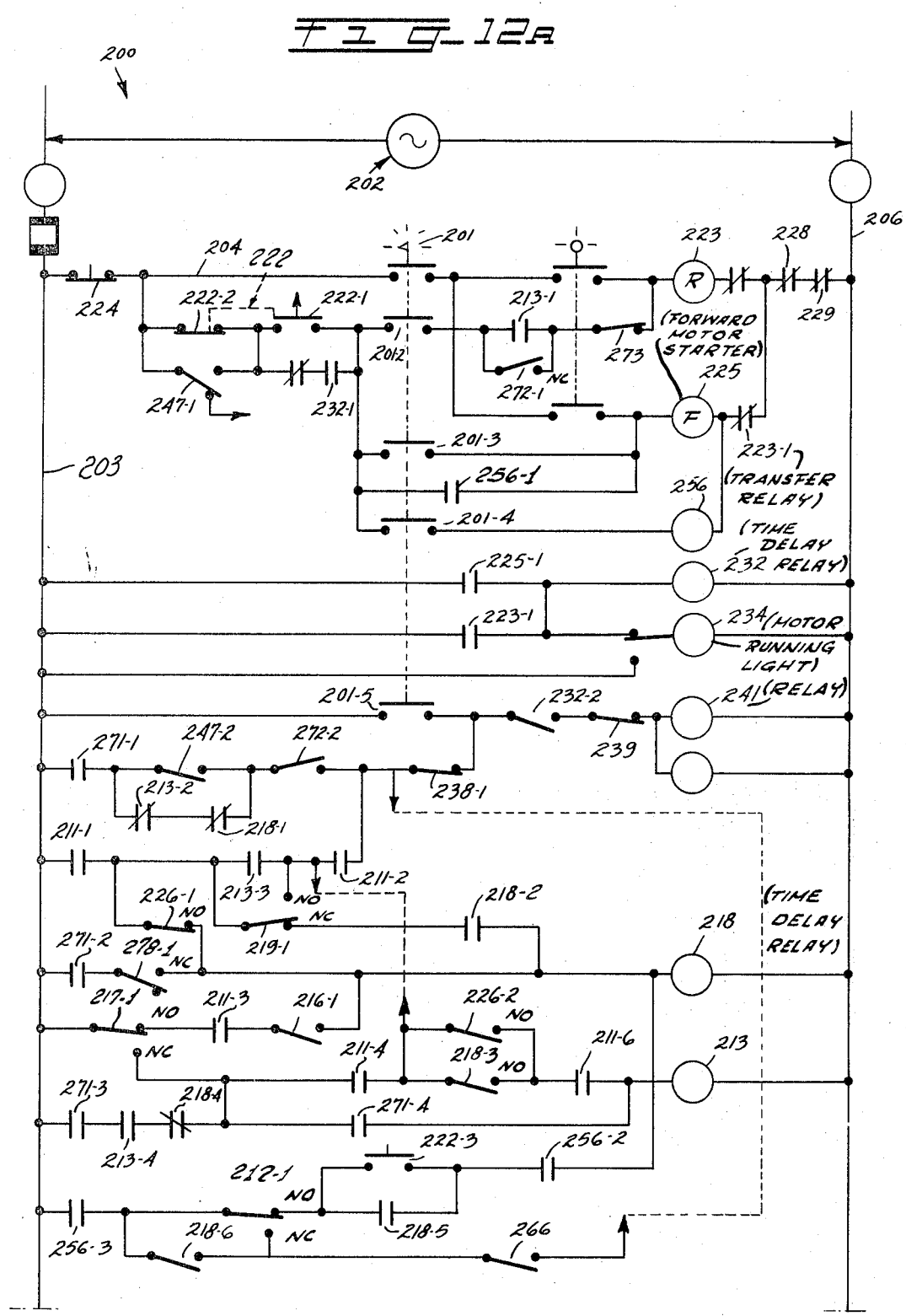

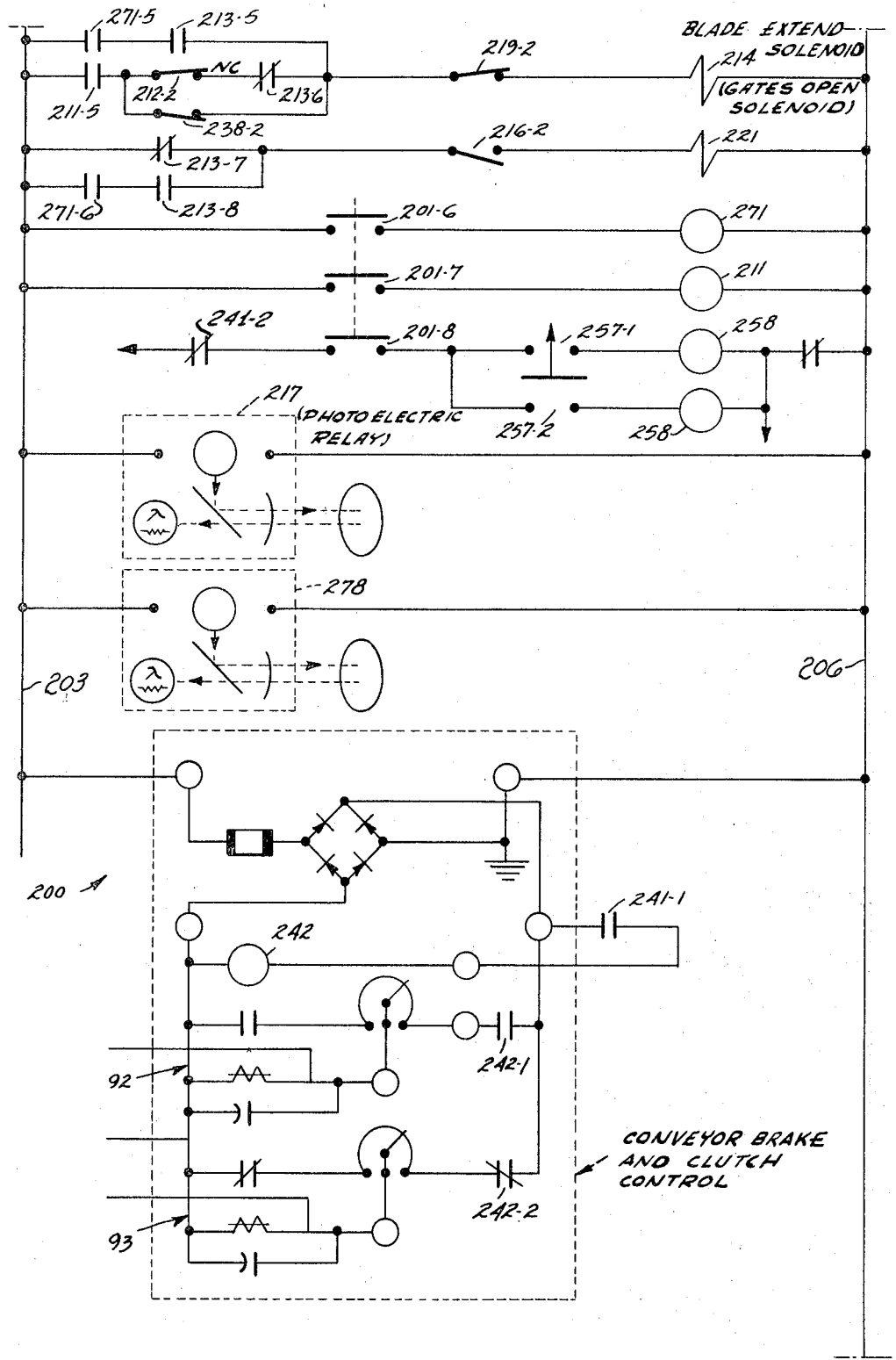

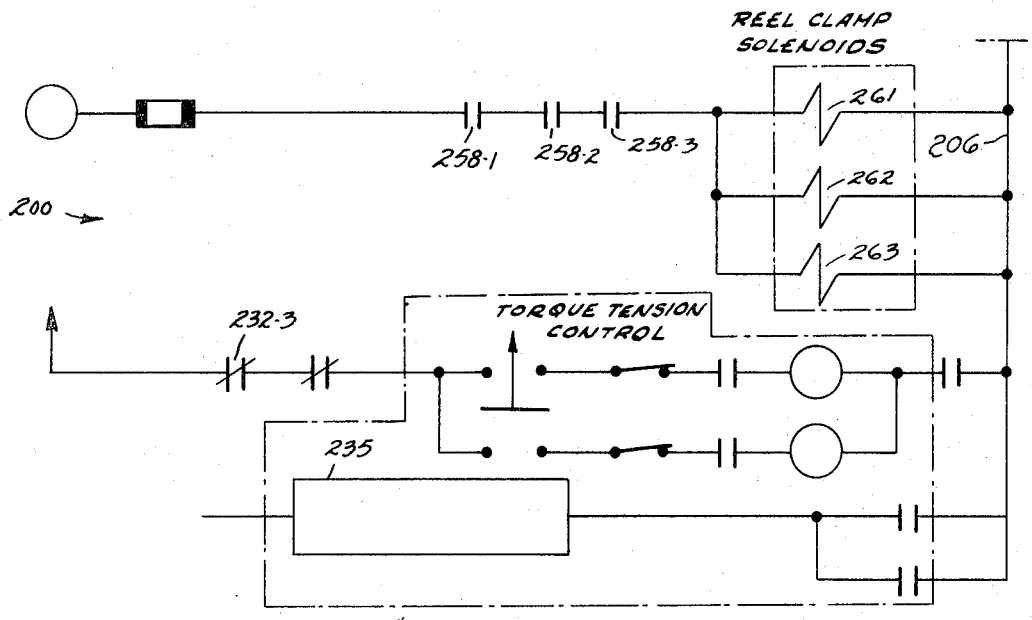
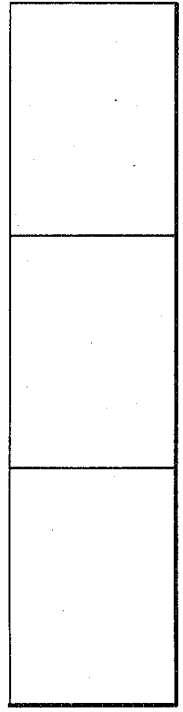

United States Patent Office 3,528,619
Patented Sept. 15, 1970

3,528,619
APPARATUS FOR HANDLING A PLURALITY OF CYLINDRICAL ARTICLES, SUCH AS REELS OF WIRE
Helmut E. Durr, Chatham, N.J., assignor to Western Electric Company, Incorporated, New York, N.Y., a corporation of New York
Filed July 31, 1968, Ser. No. 749,039
Int. Cl. B65h 54/00
U.S. Cl. 242—25        22 Claims

ABSTRACT OF THE DISCLOSURE

Reels of wire are loaded onto a lower guideway of a supply payoff stand and are then moved by a conveyer chain engaging one flange of the reels to an upper guideway into registration with payout positions whereat each of the reels is moved transversely of and off the upper guideway and supported between a pair of opposed cones for payoff. After the wire has been payed off, the conveyer again advances reels of wire into the payoff positions and moves the empty reels to the lower guideway for removal therefrom. Additional reels of wire are then loaded onto the lower guideway for the next cycle while the wire on the reels on the upper guideway is payed off.

BACKGROUND OF THE INVENTION

Field of the invention

This invention relates to an apparatus for handling a plurality of cylindrical articles, and more particularly, to a supply stand, including a single conveyor chain, for positioning a plurality of reels of wire for payoff during a cable stranding operation.

Technical consideration and prior art

In the manufacture of telephone cables, bare wires are insulated with pulp or plastic material, and the individually insulated wires are twisted together in pairs and taken up on supply reels. The supply reels are mounted on a supply stand which includes one or more rows of supply reel payoff positions. For example, in commercial practice, an installation may typically include a single supply stand having two rows of payoff positions or two or more supply stands each of which has two rows of payoff positions. The total number of payoff positions afforded by such installations is dictated by the size of the cable; i.e., the number of wire pairs, assuming a constant wire gauge. During the stranding operation, the wires advanced from the supply reels move in converging paths through openings in a face plate to a binder which wraps at least one binder thread about the grouped wires as the cable core is formed.

Ordinarily, there are two rows of reel positions in a supply stand, and in the prior art, the wire guides, tension control motors, and other facilities are mounted at an elevated position intermediate the two rows. Further, the conveyor includes a pair of chains and crosspieces for each row. For the latter reason, the wires must be guided upwardly off the tops of the reels since they must be free of the moving conveyer. As a result, it is difficult to string up the wires through the various guide means to the stranding apparatus since the guide means are not readily accessible from the floor in their elevated central location. Also, since the guide means are in an elevated central location, only one row of reels in the stand may be visible at a time to an operator who observes the pay off of the wires for possible wire breaks and reel run out from a reel having less than the required supply of wire thereon. It is important that the operator detect a wire break and reel run out as promptly as possible in order that the stranding operation will be halted immediately to mend a wire break and/or replace an empty reel by a full reel. Otherwise, many feet of wire may be passed through the stranding apparatus before the break or reel run out is detected.

One prior art design of a payoff stand includes a pair of feed tracks on which a set of supply reels are positioned for paying off wire while empty reels of a previously used set are unloaded from a lower track off the payoff stand. The pair of feeding tracks are formed to permit the free rolling of full reels to points adjacent payoff positions, and an apparatus at each payoff position is adapted upon actuation to move the reel in registration therewith, free of the tracks, and into the payoff position.

In one prior art design as exemplified by that shown in U.S. Pat. 2,332,005, dated Oct. 19, 1943, the flanged reels of wire move by gravity along an upper track with the axis of hub portion of the reel inclined to the horizontal until the reel is in registration with the payoff position. The reels are guided on the track by one of the flanges of the reels pressing against an upright leg of a guide angle due to the inclined position of the reel. When the reel is in registration with the payoff position, a movable cone adjacent one head of the reel and having a camming surface is moved manually into a hollow portion of the hub to move the reel transverse of and slightly above the tracks and to seat the reel between the movable cone member and a fixed cone in alignment therewith on the other side of the track. As the reel is moved transverse of the tracks, the reel moves up along the camming surface of the movable cone until the axis of the hub is horizontal and coincidental with the turning axes of the cones.

After the wire on the reels has been payed off, the operator merely disengages the movable cone with the hub whereupon a compression spring concentrically disposed about the fixed cone urges the reel back across the track to seat the flanges on the inclined track. After the reel is moved back onto the track, the reel rolls along the inclined track until the reel reaches an exit end and drops onto the lower guideway which also is inclined to assist in moving the reel toward an unloading point at the other end of the payoff stand.

The apparatus hereinbefore described may generally be referred to as a first generation payoff stand for a plurality of reels which avoids the problems hereinbefore alluded to. However, for production efficiency, it has been determined that certain improvements are necessary to the above apparatus. For example, in the aforementioned apparatus, the reels are loaded by the operator onto the top rails. It would be far better to have the operator load full reels of wire into the machine at a level which does not require the exertion of extremely high lifting forces.

In order to manipulate the relatively heavy supply reels into their respective payoff positions, various arrangements have been devised to ease the manual work of the operator and to improve the efficiency of the payoff function. For example, the supply reels may be loaded onto the stand at a lower level and moved upwardly to payoff positions by a conveyor. These improvements have been made in the more recent apparatus which may be referred to as second generation payoff stands. However, there do not appear to be any apparatuses commercially available which utilize a single chain conveyer together with an improved loading method.

It is therefore an object of this invention to provide an apparatus for loading reels of wire individually and successively onto a conveyer on a payoff stand and for unloading empty reels from the conveyer.

It is also an object of this invention to provide an apparatus for loading a plurality of reels of wire onto a conveyer which engages one flange or rim of each reel to move the reels to a plurality of payoff positions and then returning the empty reels after the wire has been payed off to a readily accessible unloading device for removal from the conveyer.

In addition, in the aforementioned prior art apparatus, it is necessary that the operator align manually each of the reels successively with the cones of a payoff position and then hold the reels and simultaneously move one of the cones into the hub of the reel to raise the reel above the conveyor track. Needless to say, this may be a time-consuming operation and requires a good bit of dexterity on the part of the operator in holding the reel in alignment with the cones with one hand, generally, at a raised level, while moving an actuating handle with the other hand.

Therefore, it is an object of this invention to provide a payoff stand which includes a single chain conveyer with facilities for automatically advancing successive reels loaded with wire on a conveyer into registration with payoff positions where the reels are automatically raised above the conveyer track into the payoff positions.

SUMMARY OF THE INVENTION

With these and other objects in mind, the present invention contemplates an apparatus for handling cylindrical articles in which the articles are loaded onto the apparatus individually and successively to engage first peripheral end sections of the articles with a single endless chain to advance the articles in a first direction to an upper level track where the articles are moved into registration with pairs of opposed support cones and then shifted transversely of and off the upper level track into a work position. Subsequently, the articles are repositioned on the upper level track and are moved in the first direction to a lower level track simultaneous with the advance of other articles into the work position after which the original articles are moved in a second direction and removed individually and successively from the apparatus.

More particularly, when it is desired to load a flanged reel of wire onto a supply stand at the start of a cabling operation, a reel of wire is placed on a slidably movable loading plate of one end of the supply stand after which a loading gate is opened, and the reel of wire depresses the loading plate to a first downwardly inclined position to roll the reel of wire along the loading plate to position one of the reel flanges between a pair of lugs carried by a chain conveyer. The chain conveyer is moved a short distance in a first direction to advance the reel of wire to a lower section of the supply stand, and bring a next successive pair of lugs into a loading position, whereafter another reel is advanced into engagement with the next successive pair of lugs. After the desired number of reels of wire have been loaded onto the lower section of the stand, the chain conveyer is operated to bring the reels of wire from the lower section at the other end of the payoff stand to an upper section of the stand and into registration with payoff positions. Simultaneously, reels at the payoff positions, now empty, are moved around at the one end of the payoff stand to the lower section of the stand for subsequent removal therefrom.

During payoff of the loaded reels, a set of empty reels may be unloaded one by one from the lower section of the stand by operating the chain conveyer in a second direction opposite to the first direction. As each of the empty reels is moved in the second direction to the unloading station, the movement of the conveyer is halted and the loading plate is moved under the flanges of the reel. Then the gate is opened and a spring urges the transfer plate to an upwardly inclined position to lift the empty reel off the conveyer lugs and roll the reel along the transfer plate through the gate. Then while the wire from the reels now in the payoff positions is payed off, a next set of full reels may be loaded into the lower section by driving the chain conveyer in the first direction and repeating the loading procedure. Additionally, the loading and unloading of the reels on and from the payoff stand may be done at the same end of the stand.

Since only a single endless chain is used, there is no obstruction of crosspieces along the conveyer and the wire paying off may be fed downwardly about a tensioning roller to wire guides readily accessible to the operator from the floor at the side of the payoff stand. Further, there is no elevated obstruction between two rolls of reels, one on each side of the payoff stand, because of the location of the wire guide means. Therefore, an operator can conveniently watch all supply reels from a single vantage point and determine when a break in the wire occurs in any one of them or when the wire on one of the reels is exhausted while wire is still paying out from the other reels.

A small auxiliary chain conveyer with spaced pairs of lugs spaced therealong is provided at each end of the stand for engaging the other flange of each reel to assist the main chain in driving the reels around the arcuate guide plates of the conveyer when the reels are moved between the upper and lower sections of the payoff stand.

Additional advantages and features of the invention will be better comprehended by reference to the drawings and the detailed description which follows. While the feeding of wire from a supply reel may be described, it will be understood that such language includes a wire pair, or may include one or more wires.

BRIEF DESCRIPTION OF THE DRAWINGS

FIG. 1 is a perspective view of an apparatus which embodies the principles of the present invention and showing a payoff stand having a device at one end thereof at which reels of wire may be loaded into the apparatus and from which empty reels may be unloaded therefrom;

FIG. 2 is an enlarged side elevational view of the device for loading reels into and unloading reels from a single chain conveyer of the apparatus shown in FIG. 1;

FIG. 3 is an elevational view of the device as shown in FIG. 2 as taken along line 3—3 in FIG. 2 for one half of the payoff stand, the loading device for the other half of the stand being identical thereto;

FIG. 4 is an end view taken along lines 4—4 in FIG. 1 and showing a lower level guideway or trackway and an upper level guideway in relation to a pair of opposed cones for supporting each of the reels at a payoff position;

FIGS. 5A and 5B are front elevational and plan views of the other end of the payoff stand and showing an auxiliary chain device for supplementing the single chain conveyer to move the reels from the lower level guideway around an arcuate guide plate to the upper level guideway;

FIG. 6 is a detail end view of the upper level guideway and showing one of the pairs of opposed cones at one of the payoff positions and also a guide roller and tension roller supported on a braking arm;

FIG. 7 is a perspective view showing the payoff of wire from a typical pair of reels at opposed positions on opposite halves of the payoff stand;

FIG. 8 is a plan view of the upper level of the payoff stand and showing a plurality of motor drives, one at each of the payoff positions with the devices on the two rows of payoff positions staggered;

FIG. 9 is a detail view of a device for adjusting the tension in the wire being payed off from one of the supply reels at a payoff position;

FIG. 10 is a front elevational view of the apparatus at the loading and unloading end thereof and showing the position of several limit switches for effectuating the operation of the loading and unloading of the reels; and FIGS. 11A, 11B, 11C, and 11D are a series of schematic views showing the sequence of steps for loading reels of wire into the apparatus and for unloading empty reels therefrom; and FIGS. 12A, 12B, 12C and 12D, inclusive, constitute a control circuit which is used together with the apparatus of the present invention to operate a loading-unloading device to place reels of wire on the payoff stand to transfer the reels to payoff positions, and to then transfer empty reels from a previous payoff cycle to the unloading device.

DETAILED DESCRIPTION OF THE INVENTION

General overall description

As can best be seen from FIG. 1, a payoff apparatus or stand, designated generally by the numeral 20, which embodies the principles of the present invention, has facilities for supporting a plurality of reels 21 of wire in two rows of payoff positions. The facilities on each half of the payoff stand 20 for moving the reels 21 of wire into the payoff positions and for supporting the reels during payoff are identical. Hence, in the general and overall description of the payoff stand 20 which follows, only one half, the left half, of the stand, as viewed in FIG. 4, will be described.

In using the payoff stand 20 (see FIG. 1), which embodies the principles of the present invention, an operator places successive flanged reels 21, loaded with wire 19, onto a platform or receiving plate 36 of a load and unload device 43 one end of the payoff stand. Each of the reels 21 includes a hub 22 (see FIG. 6) having a flanged peripheral end section 23 at each end thereof. The hub 22 is formed with a hollow portion 24 at each end and with an aperture 25 is one of the peripheral end sections 23.

Each of the loaded reels 21 rolls along onto a blade or transfer plate 44 (see FIG. 2) which is normally biased upwardly by a compression spring 47 and depresses the blade 44 and then moves against an arcuate guide plate 70 of a first or lower track or guideway, designated generally by the numerals 86. The blade 44 is withdrawn and one flange 23 of each reel is supported by a single chain or first endless conveyor, generally designated by the numeral 72 and the other flange 23 is supported by a second or auxiliary conveyor, designated generally by the numeral 101. The conveyors 72 and 101 are indexably moved to advance the reel 21 after which the operation is repeated.

The loaded reels 21 are moved along the lower guideway 86 to the other end of the payoff stand 20 by the conveyor 72 where another auxiliary second endless conveyor 101 (see FIG. 5A) engages the other flange 23 of each of the reels to assist the conveyor 72 in moving the reels around another arcuate guide plate 89 of the stand 20 and upwardly into a second or upper track or guideway 111 (see FIG. 4) where the endless chain conveyor 72 then advances the reels along spaced guide rail angles 113 and 119 into registration with each of a plurality of payoff devices, designated generally by the numerals 131.

When each of the reels 21 is in registration with one of the payoff devices 131, a support cone 133 is thrust into the hollow portion 24 at one end of the hub 22 of the reel to move the reel transversely of the upper guideway 111.

As the reel 21 is pushed across the second or upper guideway 111, the left-hand flange 23 of the reel, as viewed in FIG. 6, is cammed upwardly along a camming strip 116 on the outside guide angle 113 of the upper guideway 111. Then as the reel 21 is moved transversely of the upper guideway 111, the reel is tilted upwardly simultaneously with the movement of the hollow portion 24 at the other flange 23 of the reel over a drive cone 137 attached to a motor drive 141. At this time, the reel 21 is held between the support cone 133 and the drive cone 137 with the horizontal axis of the reel in a horizontal position and with the flanges of the reel suspended above the rail angles 113 and 119 of the upper guideway 111.

During payoff of the wire on the reels 21 now in the payoff positions, the reels are no longer in engagement with the conveyor 72. While the wire is payed off, an operator utilizes the conveyor 72 and one of the auxiliary conveyors 101 to load another predetermined number of full reels of wire onto the lower trackway 86 for the next payoff cycle.

After wire on the reels 21 suspended above the upper guideway 111 has been payed off, the air-operated cylinder 134 of each of the payout devices 131 is actuated to withdraw the support cone 133 from the reel. Simultaneously therewith, a compression spring 143 in the payout device 131 urges the drive cone 137 toward the support cone 133. The reel 21 is moved transversely back across the upper guideway 111 to again support the reel on the guide rails 113 and 119.

When the reels 21 are again supported on the upper trackway 111, each of the left-hand flanges 23, as viewed in FIG. 6, is in engagement with a pair of spaced lugs 71 on the conveyor 72. Then the conveyor 72 is operated to push the now empty reels to the right in a first clockwise direction, as viewed in FIG. 11B, down onto the lower guideway 86 and to move the full reels of wire from the lower guideway around the arcuate guide plate 89 on up to the upper guideway 111.

Then as the wire is payed out from the full reels 21 now in the payoff positions, the conveyors 72 and 101 are operated to advance the empty reels 21 on the lower guideway 86 in a second or counterclockwise direction, as viewed in FIG. 11C, and move each reel into an unload position. As the leading one of the empty reels 21 is moved into the unload position, the operation of the conveyors 72 and 101 is interrupted and the blade 44 is moved under the flanges 23 of the leading reel. Because the reel 21 is now less heavier than before due to the payout of the wire therefrom, the reel does not push the blade 44 downwardly, but rather rolls along the inclined portion of the blade through the gate 54 and into the receiving plate 36 for removal by the operator from the payoff stand. The conveyors 72 and 101 are again operated to advance each successive empty reel from the lower guideway 86 around the arcuate section 85 guide plate 70 to the unloading position whereupon the unloading cycle is repeated.

With the payoff stand 20 described hereinbefore in general terms, a detailed description of the operating devices of the payoff stand will now be described in detail.

Load and unload station

At the load and unload station, designated generally by the numeral 26, and shown in FIGS. 1 and 3, a pair of spaced, vertical side plates 27 are attached to a base plate 28 and to short columns 29 of a frame, designated generally by the numeral 31 (see FIGS. 1, and 2). The frame 31 includes a apir of spaced I-beams 32 (see FIG. 3) which are supported on a base 33. The short columns 29 and the base plate 28 which are mounted on the I-beams 32 support the payoff stand 20.

The spaced, vertical plates 27 have outwardly projecting lips 34 (see FIG. 1) and a receiving plate 36 onto which an operator places reels 21 loaded with wire which is to be payed off from the reel on the payoff stand 20 in the manufacture of a cable. Also attached to each of the vertical side plates 27 on the inner surface thereof is an angle bracket 37 on which is mounted a support plate 38 spaced below the receiving plate 36 (see FIG. 3).

The support plate 38 has a trapezoidal rail 39 formed integrally therewith which is received in and is slidably movable in a way 41 formed in a carrier bar 42 (see FIGS. 2 and 3). The slidably movable carrier bar 42 forms an integral part of a loading and unloading device, designated generally by the numeral 43.

The loading and unloading device 43 includes a guide blade or transfer plate 44 having a tapered end and which is mounted pivotally about a bearing 46 supported at the right-hand end of the carrier bar 42, as viewed in FIG. 2. Moreover, the blade 44 is biased in an upward, clockwise direction, as viewed in FIG. 2 by a compression spring 47 received in a housing 48. The other end of the carrier bar 42 has a portion 49 depending downwardly therefrom and which is attached to a rod 51 extending from a piston 52 of an air cylinder 53. The air cylinder 53 is attached to the underside of the support plate 38 and when operated, moves the carrier bar 42 slidably along the trapezoidal rail 39 to move the blade 44 inwardly toward the payoff stand 20.

The compression spring 47 is selected so that when a reel 21, loaded with wire, is moved onto the blade 44, the blade is urged downwardly to compress the spring 47 to roll the reel 21 of wire in toward the payoff stand 20. Conversely, when the wire has been payed off from the reel 21, and the reel is advanced into the unloading position, the blade 44 is moved under the reel, and when released, is urged upwardly to lift the empty reel and roll the reel along the blade which is then in an inclined position, as shown in FIG. 2, back through a gate, designated generally by the numeral 54, and onto the receiving plate 36.

The gate 54 is used together with the load and unload device 43 to move the reels 21 into and out of the payoff stand 20 individually. The gate 54 includes a pair of spaced cover sections 56, which are arcuately formed and which are slidably mounted on spaced, parallel guide rods 57 and 58 (see FIGS. 2 and 3). In FIG. 3, the left one of the cover sections 56 is shown in a closed position while the right one of the cover sections is shown in an open position.

As is shown in FIG. 3, the upper portions of an outwardly extending mounting plate 60 of the cover sections 56 is attached to a sleeve 59 which is slidably mounted on the guide rod 57. The guide rod 57 extends through a bore 61 in a bearing block 62 that is mounted on the frame 31 of the payoff stand 20. Similarly, the lower portions of each of the cover sections 56 are attached to a sleeve 63 which is slidably mounted on the rod 58 and which is received in a bore 64 of another bearing block 66, also supported on the frame 31. Also, each of the cover sections 56 has an outer keeper plate 65 extending toward the column 29, as viewed in FIG. 3, for restraining the lateral movement of reels 21 on the payoff stand 20.

The gate 54 is mounted for opening and closing by attaching each cover section 56 independently to a pusher pad 67 (see FIG. 3) on an end of a rod 68 extending from an air cylinder 69. In this way, each of the cover sections 56 is individually movable by the air cylinders 69 along the guide rods 57 and 58. When the cover sections 56 are in an unoperated position (see left half of FIG. 3), the distance between the cover sections is less than the outside distance between the flanges 23 of the reels 21 so that the reels cannot pass through the gate 54 (see broken line view of reel in left half of FIG. 3). Conversely, when the cover sections 56 have been moved away from each other by the air cylinders 69, the distance between the cover sections is sufficient to allow a reel 21 to pass therebetween (see broken line view of reel in right half of FIG. 3).

As can be seen in FIGS. 2 and 3, when the carrier bar 42 is moved toward the column 29, the blade 44, having a tapered end 45 (see FIG. 2), is advanced under the lower portions of the cover sections 56. The cover sections 56 of the gate 54 maintain the guide blade 44 in a first position inclined toward the carrier bar 42.

Lower guideway and conveyer

When each of the reels 21 is placed individually on the receiving plate 36 and rolls onto the blade 44, the blade is pivoted counterclockwise, as viewed in FIG. 2, against the urging of the compression spring 47 so that the reel rolls downwardly along the blade toward the payoff stand 20. The reel 21 continues to roll until the flanges 23 engage an arcuate guide plate 70 to halt the rolling of the reel. When the reel 21 comes to rest against the arcuate guide plate 70, the left-hand flange 23 of the reel, as viewed in FIG. 3, is in engagement with a pair of spaced lugs 71 in the form of friction rollers mounted on a first endless conveyer chain, designated generally by the numeral 72.

The conveyer chain 72 is mounted on two spaced sprockets 73 and is driven by a drive mechanism, designated generally by the numerals 74 (see FIGS. 2 and 5). The lugs 71 are rotatably mounted on L-shaped supports 76 which are attached to an angle section 77 that is mounted on chain rollers 78 (see FIGS. 4 and 6). The rollers 78 are received in a groove 79 of a channel 81. The channel 81 for housing that part of the conveyer chain loop nearest the base 28 is supported on clip angles 82 which are mounted on the short columns 29 (see FIG. 4).

The lugs 71 are spaced apart so that each pair of the lugs engages opposed, peripheral portions of one flange 23 of the reel 21 and moves the reel from the load-unload station 26 around the arcuate guide plate 70 to a lower guideway, designated generally by the numeral 86. The lower guideway 86 comprises a pair of spaced angles 87 which are secured to the base plate 28 supported on the base 33 with a leg 88 of the angle 87 projecting upwardly. As the reels 21 of wire are supported on the lower guideway 86, the flanges 23 of the reel are in abutting engagement with the inside opposed faces of the upright legs 88 of the angles 87. The endless conveyer chain 72 is driven continuously to exert a pushing force against and roll the reels 21 along the lower guideway 86 toward the left-hand end of the payoff stand 20, as viewed in FIG. 1.

It should be observed from FIG. 2 that the turning axis of the sprocket 73 is offset longitudinally from the center of curvature of the arcuate guide plate 70. In this way, as the conveyer chain 72 is advanced, the conveyer chain moves in an arcuate path between the arcuate guide plate 70 and the loading gate 54.

Conveyer drive and auxiliary drive

Referring now to FIGS. 5A and 5B, there is shown, in detail, the drive mechanism 74 for driving the conveyer chain 72 about the sprockets 73. The drive mechanism 74 is positioned adjacent the other end of the payoff stand 20 and includes a motor 91 which is supported on the base plate 28. The motor 91 is connected through one side of a conveyer drive reducer clutch 92 and through a conveyer drive reducing brake 93 to one side of a gear reduction unit 94. Then the other side of the gear reduction unit 94 is connected to a shaft 95 that turns a drive pinion 96. A drive chain 98 is mounted on the pinion 96 and continues around the left-hand drive drive sprocket 73. In operation, the drive mechanism 74 is used to drive the single endless conveyer chain 72 to engage one flange 23 of the reels 21 and roll the reels along either the lower guideway 86 or along an upper level of the payoff stand 20.

To advance the reels 21 from the lower guideway level to the upper level requires the use of an auxiliary or second endless conveyer chain, designated generally by the numeral 101 (see FIG. 5A). An auxiliary conveyer chain is necessary since the rollers 71 of the conveyer 72 engage only first peripheral end sections or flanges 23 of the reels 21 and the reels would become skewed as the conveyer 72 moves the reels around another arcuate guide plate 89 at the other end of the payoff stand 20 (see FIG. 5A). The auxiliary conveyers 101, one positioned at the each end of the payoff stand, as viewed in FIGS. 5A and 2, engages the second peripheral end sections of the reels 21 as the reels approach the arcuate guide plates 89 and 70 respectively.

The auxiliary conveyer 101 comprises a large sprocket 102 similar to the sprocket 73 and mounted on the shaft 75 together with the sprocket 73. An auxiliary conveyer chain 103 having a plurality of pairs of lugs 104 in the form of friction rollers mounted and spaced thereon, is received on the teeth of the sprocket 102 and continues downwardly and to the right, as viewed in FIG. 5A, into engagement with a second sprocket 106 which is mounted on a shaft 107 extending from a bearing 108. Since the sprocket 102 is keyed to the shaft 75, the turning of the drive chain 98 by the motor 91 also turns the sprocket 102 and chain 101. Then as the reels 21 are pushed along the lower guideway 86 around the arcuate guide plate 89 and confined against the arcuate guide plate by a curved lid 105, the lugs 104 on the auxiliary conveyer chain 103 engage the second peripheral end sections or flanges 23 of the reels to assist the main conveyer 72 in moving the reels to an upper level of the payoff stand 20.

Upper guideway

After the loaded reels 21 have been moved around the arcuate section 89 of the payoff stand 20, the reels are moved onto an upper guideway, designated generally by the numeral 111 (see FIGS. 4 and 6). The channel 81, which is continuous and is adjacent the upper guideway 111, is supported on angle seat brackets 112 which cantilever outwardly from upper portions of the short columns 29. As viewed in FIGS. 4 and 6, the upper guideway 111 includes an outer rail angle (left-hand angle, as viewed in FIG. 6) 113, which is mounted on a bearing block 114 supported on the outer end of the cantilever brackets 112. Additionally, a beveled camming strip 116 is attached to the upper surface of a horizontal leg 117 of the left-hand rail angle 113. A vertical leg 118 of the rail angle extends upwardly toward the L-shaped supports 76 of the conveyer chain 72.

The upper guideway 111 also includes an inner rail angle 119 (right-hand guide rail angle, as viewed in FIG. 6), having a vertical leg 121 turned downwardly and attached to a beam 122. The beam 122 is supported from stringers 123 which are spaced and span across the top of a center H-beam 124. The center H-beam 124 is supported on posts 126 (see FIG. 4). It should be noted from FIGS. 4 and 6 that the top surface of the beveled camming strip 116 is in the same plane with the top surface of a horizontal leg 127 of the right-hand guide rail angle 119. It follows that the top surface of the horizontal leg 127 of the guide rail angle 119 is above the top surface of the horizontal leg 117 of the left-hand guide rail angle 113.

It should be noted that when the reel 21 is rolled along the upper guideway 111, with the left-hand flange of the reel 21, as viewed in FIG. 4, on the left-hand guide angle 113 between the beveled camming strip 116 and the vertical leg 118, and with the right-hand flange 23 on the horizontal leg 127 of the right-hand angle 119, the longitudinal axis of the hub 22 is inclined to the horizontal (see broken line view of reel in right half of payoff stand in FIG. 4).

Payoff device

As the endless conveyer chain 72 advances each of the spaced, loaded reels 21 along the upper guideway 111, the loaded reels are halted when in registration with payoff devices, designated generally by the numeral 131 (see FIGS. 1, 4 and 8). At each of the payoff positions, there is mounted a support payoff cone 133 on a top angled portion 132 of the column 29. The payoff cone 133, as viewed in FIG. 6, is mounted on and adjacent the outer side of the payoff stand 20 and is slidably movable inwardly toward the center of the upper guideway 111 and retractable therefrom by an air-operated cylinder 134. The support cone 133 has a beveled annular surface 136 to facilitate engaging the hollow portion 24 of the reel 21.

Opposed to and in alignment with the support cone 133 is a driving payoff cone 137 which is mounted on a face plate 138 that is rotatably mounted on a shaft 135 extending from a motor drive 141 (see FIGS. 4 and 6). The motor drive 141 is mounted on a shelf bracket 142 supported on the H-beam 124. The face plate 138 and cone 137 are biased inwardly to the left, as viewed in FIG. 6, toward the center of the guideway 111 by a compression spring 143 which is concentrically disposed about the shaft 139 and which bears against a back-up plate 144 rigidly mounted on the shaft.

Although the driving cone 137 frictionally engages with the walls of the hollow portion 24 of the hub 22 of the reel 21, the use of a driving pin 149 insures against slippage during payoff of the wire 19. A cylindrical housing 146 mounted within the face plate 138 and has a small compression spring 147 received therein. The compression spring 147 is concentrically disposed about a shank 148 of the driving pin 149 which has a flange 151. The flange 151 of the driving pin 149 abuts an inside annular surface 152 of the housing 146 and the locking pin extends horizontally from the face plate 138 to engage the aperture 25 in the flange 23 of the reel 21 and serves as a positive connection between the reel and the motor drive 141.

When the reel 21 is in registration with the payoff device 131, the support cone 133 is moved by the air cylinder 134 to thrust the cone into the hollow portion 24 of the reel 21. As the cone 133 is thrust into the hollow portion 24 of the reel 21, the cone urges the reel transversely across the upper guideway 111 so that the left-hand outer flange 23 of the reel 21, as viewed in FIG. 6, rides upwardly along the beveled camming strip 116 to tilt the reel counterclockwise into a position with the horizontal axis of the hub 22 of the reel coincidental with the turning axes of the cones 133 and 137, respectively. As the reel 21 is cammed upwardly and lifted into the horizontal payout position, the right-hand flange 23 of the reel is moved over the driving cone 137 so that the driving pin 149 is received in the aperture 25 in the flange 23 of the reel 21. The driving pin 149 may or may not register with the aperture 25 of the flange 23 during the mounting of the reel 21 on the cones 133 and 137, but during the first revolution of the motor 141, the drive pin will be brought into registration with the aperture to effectuate a positive connection for the rotation of the reel with the payout drive motor.

As can best be seen in FIG. 8, the payout positions on opposite sides of the payoff stand 20 are staggered along the upper guideways 111 with the drive motors 141 on the left-hand side of the stand, as viewed in FIG. 8, interposed between the drive motors for the payout devices on the right-hand side of the stand.

Wire guide and tension control device

At each of the payout positions, there is mounted a fixed payoff roller 156 which is supported between the cantilevered brackets 112 and the beam 122 resting on the stringers 123 (see FIGS. 4 and 6). The fixed roller 156 is rotatably mounted between these supports and guides the wire from the loaded reel 21 (see FIG. 7).

Also, at each of the payout positions there is mounted a movable tension control roller 157 of a braking mechanism, designated generally by the numeral 158. The movable roller 157 is rotatably mounted on one end of a tension arm 159 which extends through an arcuate slot 161 cut in a vertical leg 162 of the shelf bracket 142 to a lower portion 163 of the braking mechanism 158 (see FIGS. 4 and 6). The braking mechanism 158 includes a clock spring 164 which is received in a housing 166 (see FIG. 9).

The clock spring 164 is wound about a ball screw 165, which is horizontally disposed in a bore 168 through the housing 166 (see FIG. 6). As can best be seen in FIG. 9, one end of the clock spring 164 is attached to an upper end of the lower portion 163 and housing 166 of the brake mechanism 158 and an inner end of the spring is attached to an outer sleeve 167 of the ball screw 165.

The ball screw 165 is formed with a shaft 169 having a groove 170 formed along the periphery thereof for receiving a plurality of balls 171. The ball screw 165 is advanced through the housing 166 to the left, as viewed in FIG. 6, or out of the housing to the right, as the clock spring 164 is wound to place the convolutions closer together or unwound to place the convolutions further apart.

Should the tension in the wire 19 during pay out from the reel 21 be too great, the tension in the wire will urge the movable roller 157 in a counterclockwise direction, as viewed in FIG. 9, so that the clock spring 164 tends to unwind. As the clock spring 164 unwinds, the ball screw 164 moves to the right, as viewed in FIG. 6, to release a pair of spaced compression springs 172 and thereupon relieve a compression force against a plurality of pressure pads 173 to move away from a shaft plate (not shown) of the motor 141. The braking force on the motor 141 is reduced and the wire 19 is payed out faster to reduce the tension in the wire.

Conversely, if tension during payout of the wire 19 from the reel 21 currently in an individual payout position is lower than a predetermined amount, the wire exerts a force against the roller 157 which is less than the inherent spring force of the clock spring 164. The clock spring 164 overcomes the force of the wire 19 against the roller 157 and moves the arm 159 clockwise, as viewed in FIG. 9, to wind the clock spring 164 and thereupon advance the ball screw 165 in toward the motor 141. The ball screw 165 depresses the springs 172 and compresses the friction pads 173 to reduce the velocity of the motor 141 and hence the pay off.

The braking mechanisms 158 for all of the payout positions may be simultaneously adjusted for different gage wire strands and payoff conditions by turning the housing 166 a predetermined angle prior to pay off. The housing 166 is attached to an adjusting drum 176 (see FIG. 6) which extends from the housing toward the longitudinal center line of the payoff stand 20 and then has a portion 177 extending upwardly. The vertical extending portion 177 has a plurality of serrations 178 cut along an upper peripheral edge which are engaged by an adjusting mechanism, designated generally by the numeral 179 (see FIGS. 6 and 9).

Referring now to FIG. 9, the adjusting mechanism 179 includes a rod 181 parallel with the longitudinal axis of the payoff stand 20 and having worm gears 182 spaced therealong. Each of the worm gears 182 meshes with the serrations 178 of one of the adjusting drums 176 at each of the payout positions. At each of the payout positions, the worm gear 182 is supported on an enlarged portion 183 of the rod 181 which is held between a pair of spaced sleeve bearings 184 in a casing 186. The rod 181 extends from opposite ends of the enlarged portion 183 through the sleeve bearings 184. The rods 181 are supported from the frame 31 at spaced points along the payoff stand 20. For paying off wires of a finer gauge than those in a current schedule, the rods 181 are moved to turn the housing 166 counterclockwise as viewed in FIG. 9 to unwind the clock spring 164; conversely, if the wire 19 for the next schedule is heavier gauge, rods 181 are moved to wind the clock spring.

CONTROL SYSTEM AND OPERATION

General

The overall operation of the payoff stand 20 can be separated into three general steps with each of the three steps described in detail. Referring now to FIG. 12, there is shown a schematic drawing of an electrical control circuit 200 for controlling the operation of the payoff stand 20. In the first of the three steps, the operator loads the payoff stand 20 with reels 21 of wire by turning a selector switch 201 to a load position whereupon the blade 44 is extended to the left, as viewed in FIG. 2, and the gate 54 is opened. Then the operator turns on a cycle start switch 222 to start up the motor 91 of the conveyor 72. A full reel 21 of wire is placed on the receiving plate 36 and rolls downwardly and to the left along the blade 44 into engagement with lugs 71 and 104 currently in the load position. The gate 54 is closed and the plate 44 is retracted to an original position after which the conveyers 72 and 101 are indexed in a clockwise first direction one flight until next successive pairs of lugs are in alignment with the load position. Since the chains 101 are driven by the shafts 75 along the sprockets 73, wherever the conveyer 72 is advanced, the auxiliary conveyers at each end of the stand 20 are also turned. The blade 44 is again extended into the payoff stand 20 and the gate 54 is opened and another reel 21 of wire is loaded on the payoff stand. This procedure is continued until the last of the required number of reels 21 for the payout positions on one half of the payoff stand 20 has been moved by the conveyor around the arcuate guide plate 70 and onto the lower guideway 86. Then the conveyer 72 is indexed two flights and the gate 54 remains closed signifying that the required number of reels has been loaded onto the payoff stand 20.

In the second general step of the operation of the payoff stand 20, the operator turns selector switch 201 to a transfer position at which time the air cylinders 134 are operated to withdraw the support cones 133 from engagement with the hubs 22 of the now empty reels in the payoff positions above the upper guideway 111. The compression springs 143 exert a pushing force against the flanges 23 to push the reels 21 to the left, as viewed in FIGS. 4 and 6, back onto the rail angles 113 and 119 of the upper guideway 111. Then the operator actuates the cycle start switch 222 to energize the motor 91 and move the conveyer 72 until all of the reels 21 of wire on the lower guideway 86 are transferred around the arcuate section 89 of the lower guideway and onto the upper guideway 111, and into registration with the payoff positions. Simultaneously, the empty reels 21 from the upper guideway 111 are transferred in the first direction around the arcuate section 70 onto the lower guideway 86. Then the operator turns a clamping cylinder switch 257 to an EXTEND position whereupon the air cylinders 134 are operated to move slidably the support cones 133 to the right, as viewed in FIGS. 4 and 6, to move the reels 21 of wire transversely of and off the upper guideway 111 to support the reels between the cones 133 and 137 for pay off.

In the third general step of operation of the payoff apparatus 20, the operator turns the selector switch 201 to an UNLOAD position and operates the cycle start switch 222. The drive motor 91 advances the conveyer 72 in a counterclockwise direction until a conveyer photoelectric beam picks up a leading one of the empty reels 21 on the arcuate section 70. The drive motor 91 is de-energized to stop the conveyer 72 whereupon the blade 44 is moved inwardly slidably to the left under the gate 54 and under the hub 22 of the leading reel 21. The cover sections 56 are moved slidably away from each other on the guide rods 57 and 58 to open the gate 54 whereupon the compression spring 47 urges the blade 44 upwardly to a second position inclined away from the carrier bar 42. The empty reel 21 is urged upwardly off the conveyer lugs 71 and 104 and rolls downwardly to the right, as viewed in FIG. 2, out onto the receiving plate 36 and interrupting a beam of light from an unload photoelectric unit detector 278. The operator removes the empty reel from the receiving plate 36 thereupon restoring the beam of light to operate the air cylinders 69 to close the gate 54 and to operate the air cylinder 53 to retract the blade 44. Then the conveyer 72 is moved another flight to position the next successive pair of lugs at the unload position whereupon the steps hereinbefore described are repeated. After the last empty reel has rolled out of the conveyer 72 and is detected by the unload photoelectric detector 278, the conveyer motor 91 is de-energized, and the payoff stand 20 is in condition for another cycle of operation.

Having described the general overall operation of the apparatus 20, each of the three general steps of the operation will now be described in detail.

Loading operation

In the operation of the payoff apparatus 20 to load reels 21 of wire onto the payoff apparatus, reference is made to an electrical control circuit 200 which is shown in schematic FIGS. 12A, 12B and 12C. The operator turns a selector switch 201 to a load position which completes a circuit from a source 202 through a main bus 203 and a cross connector 204 to the switch and then back through another bus 206 back to the source. The completion of the circuit through selector switch 201 closes normally open contacts 201–3 to enable a starter circuit for the conveyer motor 91, and closes contacts 201–7 to energize a load relay 211.

The energization of the relay 211 closes pairs of relay contacts 211–1, 211–2, 211–3, 211–4, 211–5 and 211–6 to enable a plurality of load sequencing circuits. The closing of contacts 211–5 completes a circuit through contacts 212–2 of a normally closed load and transfer limit switch 212 (see FIG. 5A) and a pair of normally closed contacts 213–6 of a relay 213 and through a pair of normally closed contacts 219–2 of a time stop and index limit switch 219 (see FIG. 10) and energizes the winding of a plate extend solenoid 214 which actuates the air cylinder 53 to move the rod 51 to the left, as viewed in FIG. 2, in toward the single chain conveyor 72.

When the blade 44 is fully extended in toward the conveyor 72, the blade engages a blade-extended limit switch 216 (see FIG. 2) and closes a pair of switch contacts 216–1 to complete a circuit through now closed contacts 211–3 and a reel photoelectric detector 217 (see FIG. 10) to energize a time delay relay 218. The time delay relay 218 is held in an energized condition by a circuit through the now closed contacts 211–1, a pair of normally closed contacts 219–1 of a time-stop and index cam operated limit switch 219 and a pair of now closed contacts 218–4. The energization of the time delay relay 218 also closes a pair of contacts 218–3 to enable a circuit between the buses 203 and 206 to energize the relay 213. Other pairs of contacts associated with the time delay relay are also closed, but are positioned in now disabled circuits which are used in the subsequent transfer and unloading of the reels 21.

Additionally, when the limit switch 216 is actuated, a pair of contacts 216–2 are closed to complete a circuit through normally closed contacts 213–7 to energize the winding of a solenoid 221 which operates the air cylinders 69 to move slidably the cover sections 56 away from each other to open the gate 54 (see FIG. 3).

Then the operator depresses a stop cycle start selector switch 222 to a "cycle start" position whereupon a coil of a forward motor starter 225 is energized through a circuit completed through a push-button switch 224, selector switch contacts 222–2, 222–1, 201–3, the forward motor starter 225 and motor starter overload contacts 228 and 229. The contacts of the reversing motor starter 223 are operated to start up the motor 91 for the conveyor 72 and to lock out the coil of the forward motor starter 225, and energizes a time delay relay 232 through a pair of contacts 225–1 of the motor starter 225. Moreover, a pair of contacts 223–1 are closed to complete a circuit through a motor running light 234 to illuminate the light.

When the time delay relay 232 is energized, a pair of instantaneous relay contacts 232–1 are closed to provide a holding circuit for the reversing motor starter coil 223 through the pushbutton switch 224, selector switch contacts 222–2, selector switch contacts 201–3, the forward motor starter 225 and contacts 223–1 and then through normally closed motor starter overload contacts 228 and 229. Also, instantaneous contacts 232–3, normally closed, are opened to disable a torque tensioning motor 235 while the conveyor motor 91 is turning.

The operator then loads a reel 21 of wire onto the receiving plate 36 of the load and unload device 43. The loaded reel of wire is rolled down onto the transfer blade 44 (see FIG. 2) and urges the blade into a first position inclined toward the carrier bar 42 against the compression spring 47. The loaded reel 21 rolls along the blade 44 and comes to rest with the flanges 23 in engagement with the arcuate guide plate 70 and with one of the flanges engaged between a pair of spaced lugs 71 on the conveyer 72 and with the other flange in engagement with a pair of lugs 104 on the auxiliary conveyer 101. As the reel 21 comes into engagement with the arcuate guide plate 70, the reel interrupts a light beam of the reel photoelectric detector 217 (see FIG. 10) to energize the detector relay, and close normally open contacts 217–1. The closing of contacts 237–1 completes a circuit through now closed contacts 211–4 and now closed time delay relay contacts 218–3 and then through now closed contacts 211–6 to energize the relay 213.

When relay 213 is energized, a pair of contacts 213–3 are closed to enable a conveyer brake and clutch relay circuit. Normally closed contacts 213–6 and 213–7 are opened to de-energize solenoid 221 whereupon the air cylinders 69 are actuated to move the cover sections 56 toward one another to an original gate-closed position (see FIG. 3). All other contacts associated with the relay 213 are operated, but are positioned in now disabled circuits which are used during the unload and transfer steps. As the gate cover sections 56 are returned to the original position, a gates closed limit switch 238 (see FIG. 10) is actuated.

As limit switch 238 is actuated, a pair of contacts 238–1 are closed to enable the brake and clutch relay circuit. Simultaneously, normally closed contacts 238–2 open to de-energize the winding of solenoid 214 and actuate the air cylinder 53 to retract the transfer blade 44 away from the conveyer 72 (see broken line retracted view of blade in FIG. 2). When the blade 44 is retracted, the blade actuates a plate-retracted limit switch 239 (see FIG. 2).

The actuation of limit switch 239 completes a circuit through now closed contacts 211–1, now closed contacts 213–3, now closed contacts 211–2, closed limit switch contacts 238–1, and then through time delay relay contacts 232–2 to energize a conveyer reducer brake and clutch control relay 241. Relay 241, now energized, closes contacts 241–1 to energize a control relay 242. Moreover, a pair of contacts 241–2 function in a disabled circuit used in the transfer sequence only.

Then relay contacts 242–1 are closed to energize the conveyer drive reducer clutch 92 whereafter relay contacts 242–2 open to de-energize a conveyer drive reducer brake 93 whereupon the drive motor 91 is rendered effective to advance the chain conveyers 72 and 101.

After an index timing cam 243 (see FIG. 10) has turned through 5 degrees or approximately one-eighteenth of the total travel required for the conveyer 72 to index through one flight or position, the cam operated limit switch 219 and a cam operated limit switch 247 are actuated. The actuation of limit switch 219 opens normally closed contacts 219–1 to de-energize the time delay relay 218, and now closed contacts 219–2 open to disable the plate-extend solenoid 214. A pair of normally open contacts 247–1 are closed to function in a time stop circuit in the transfer sequence of steps only; similarly, a pair of normally open contacts 247–2 are closed, but function in the unload sequence only.

Following a predetermined delay, the time delay contacts 218–3 open to de-energize relay 213. The delay is sufficient for the transfer limit switch contacts 219–1 of the limit switch 219 to close before the contacts 213–3 of now de-energized relay 213 open. The time delay relay contacts 218–2 for the holding circuit open instantaneously. Then, the relay contacts 213–6 and 213–7, normally closed, now open, are reclosed to enable the circuits for operating solenoids 214 and 221 to extend the blade 44 and open the gate 54, respectively.

As the conveyer 72 is moved one flight to position the next successive pair of lugs 71 in the form of friction rollers adjacent the load-unload station 26, the initially loaded reel 21 of wire 19 moves away from the conveyer photoelectric detector 217 (see FIG. 10) along the arcuate section 70 and onto the lower guideway 86, to restore the beam of light whereupon the conveyer photoelectric detector 217 is energized to close normally open contacts 237–1. Then, when the conveyer 72 has been indexed through one flight, the limit switch 219 is deactuated whereupon the normally open contacts 219–1 are opened to de-energize the relay 241, and then the pair of normally closed contacts 219–1, now open, are closed to enable the circuit through the time delay relay 218. Also, the contacts 219–2 are closed to energize the solenoid 214 for moving the transfer blade 44 through relay contacts 211–5 and relay contacts 213–6 (see FIG. 12B).

When the contacts 241–1 are opened to de-energize the relay 242 thereupon de-energizing the clutch 92 and energizing the brake 93, the movement of conveyer 72 is discontinued whereupon the cycle of the insertion of the blade 44 under the gate 54 and the subsequent opening of the gate to receive a loaded reel 21 of wire is repeated. As each additional reel 21 of wire is loaded onto the arcuate section 70 and thence onto the lower guideway 86, the conveyer 72 is indexed intermittently to engage the first peripheral end 23 of each of the reels and move the reel on and along the track angles 87 of the lower guideway 86 toward the left-hand end of the payoff apparatus 20 as viewed in FIG. 1.

Prior to the conveyer 72 being indexed, the limit switch 226 (see FIG. 10), which is enabled during the loading sequence only, is operated by a dog 251 on the conveyer 72. It should be observed that the limit switch 219 has not been deactuated by the dwell in the timing cam 243. Then a pair of contacts 226–2, normally open, are closed to complete a circuit through relay contacts 211–1 and limit switch contacts 219–1, normally open, and contacts 211–6 to energize the relay 213. The relay 213 is held in an energized condition through a circuit completed through contacts 211–1, contacts 213–3, limit switch contacts 226–2 and closed contacts 211–6. A pair of contacts 226–1, normally open, are closed to complete a circuit through contacts 211–1 to energize the time delay relay 218.

While the limit switch 226 is still in an operated condition, the limit switch 219 is deactuated by a dwell in the timing cam 243. Normally closed contacts 219–1 are then closed to provide an additional holding circuit to the time delay relay 218 through closed contacts 211–1 and time delay relay contacts 218–4.

As the conveyer 72 is advanced by the drive mechanism 74, additional holding circuits are maintained. If limit switch 226 is deactuated before the limit switch 219 is reactuated, then the time delay relay 218 holds in the circuit through normally closed contacts 211–1, and contacts 218–4 and the relay 213 is held in the circuit through contacts 211–1, contacts 213–3 and time delay relay contacts 218–3 and through relay contacts 211–6. But if the limit switch 219 is reactuated before, or simultaneously with, the deactuation of limit switch 226, then the time delay relay 218 is held in the circuit through contacts 211–1 and contacts 226–1 and the relay 213 is held into the circuit 200 through contacts 211–1, contacts 213–3, normally open limit switch contacts 219–1, time delay relay contacts 218–3, normally open limit switch contacts 226–2 and relay contacts 211–6.

When the conveyer dog 251 is advanced off the limit switch 226, the limit switch 226 is returned to an unoperated position; simultaneously, the conveyer cam 243 now reactuates limit switch 219 whereupon both relay 213 and the time delay relay 218 are de-energized in that order due to the delay in opening the relay contacts 218–3.

As the conveyer 72 is advanced indexably through a final move or flight, the limit switch 219 is deactuated and the load and transfer limit switch 212 (see FIG. 5A) is actuated. The limit switch 212 opens normally closed contacts 212–2 to disable a circuit through the solenoid 214. A pair of contacts 212–1 are enabled only during the transfer of the reels 21 from the lower guideway 86 to the upper guideway 111. The contacts 219–1 are opened to de-energize the relay 341 to stop the movement of the conveyer 72. Then the contacts 219–2 close, but are disabled by the contacts 212–2 to prevent the blade 44 from being extended in toward the payoff stand conveyer 72 during the transfer of the full reels from the lower guideway 86 to the upper guideway 111 and the simultaneous transfer of the empty reels from the upper guideway 111 to the lower guideway 86.

After all of the required reels 21 of wire have been loaded onto the lower guideway 86, the operator turns the selector switch 222 to a TIMED-STOP position, or alternately, may depress the pushbutton switch 224 to de-energize the reversing motor starter 223 and de-energize the conveyer motor 91 of the drive mechanism 74.

Transfer operation

After the required number of reels 21 of wire have been loaded onto the lower guideway 86, the operator sets the selector switch 201 to a TRANSFER position which signals the initiation of a sequence of operations to move the loaded reels around the arcuate section 89 of the payoff stand 20 to the upper guideway 111. A pair of contacts 201–4 are closed to enable an energization circuit for a transfer relay 256 from the bus bar 203 through the relay 256 and to the bus bar 206 back to the source 202. Moreover, a pair of contacts 201–8 are closed to enable a circuit for actuating the reel clamping air cylinders 134 in the payoff positions.

The operator then operates a clamp cylinder extend-retract selector switch 257 to a RETRACT position to energize a coil of a latching relay 258 and close a pair of contacts 258–2 through a circuit through the pushbutton switch 224, normaly closed contacts 247–1 of the limit switch 247, relay contacts 241–2, selector switch contacts 201–8 and interlock contacts of the motors 141 which are closed when the reel motor drives are stopped.

The energization of the latching relay 258 closes contacts 258–1, 258–2, and 258–3 whereupon ganged reel clamp solenoids 261, 262, and 263 are energized to retract the cones 133 from within the hollow portions 24 of the reels 21 now in the payoff devices 131. When the cones 133 are fully retracted, a reel-cone-retracted limit switch 266 (see FIG. 10) is actuated and closes a pair of normally open contacts 266–1 to enable the circuit through the relay 241. Then the operator turns the selector switch 222 to a CYCLE START position whereupon contacts 222–2 remain closed and a pair of contacts 222–1 are closed to complete a circuit through pushbutton switch 224 and contacts 201–4 to energize the transfer relay 256. Moreover, when the operator turns the switch 222 to the CYCLE START position, the contacts 222–3 are closed to enable a circuit through the time delay relay 218.

The energization of the relay 256 closes contacts 256–1 and completes a circuit through pushbutton switch 224, selector switch contacts 222–2, selector switch contacts 222–1, motor starter 225 and overload contacts 228 and 229, to energize the reversing motor starter 223. Also the energization of the relay 256 closes the relay contacts 256–2 and 256–3 to complete a circuit through now closed, normally open, limit switch contacts 212–1 and selector switch contacts 222–3 to energize the time delay relay 218. After the operator releases the selector switch 222, the time delay relay 218 is held in an energized condition by a completed circuit through relay contacts 256–3, limit switch contacts 212–1, time delay relay contacts 218–5 and relay contacts 256–2.

The energization of the coil of the reversing motor starter 223 closes the motor contacts to start up the motor 91 of the conveyer 72, whereupon the motor interlock contacts open to lock out the coil of the forward motor starter 225. Also, a pair of control contacts 223–1 of the motor starter 223 are closed to energize the time delay relay 232 and illuminate the motor running light 234.

When the time delay relay 232 is energized, the instantaneous contacts 232–1 are closed to provide a first holding circuit for motor starter 223 through pushbutton switch 224, selector switch contacts 222–2, time delay relay contacts 232–1, relay contacts 256–1, motor starter coil 225 and overload contacts 228 and 229. A second holding circuit is also completed for the relay 256 through the pushbutton switch 224, relay contacts 222–2, time delay relay contacts 232–1, selector switch contacts 201–4, the motor starter coil 225 and overload contacts 228 and 229. Moreover, when the time delay relay 232 is energized, the time delay relay contacts 232–2 are closed to complete a circuit through relay contacts 256–3, time delay relay contacts 218–6, limit switch contacts 266–1, normally open, now closed, and a pair of limit switch contacts 238–1, normally open, now closed, of a limit switch 238 (see FIG. 10) and through the delay relay contacts 232–2 and limit switch 239 to energize the brake and clutch control relay 241.

Then when the brake and clutch control relay 241 is energized, the relay contacts 241–1 are closed to energize the relay 242, whereupon the conveyer 72 is moved as contacts 242–1 are closed to energize the clutch 92 and contacts 242–2 are then opened to de-energize the brake 93. Also, the relay contacts 241–2 are opened to disable the reel clamping cylinder and extend retract switch 257.

After the conveyer 72 has been moved to permit the dog 251 (see FIG. 10) to disengage from the limit switch 212, the limit switch 212 is returned to an unoperated condition and the time delay relay 218 is de-energized. The conveyer 72 is moved one-half a total travel distance to transfer the reels 21 of wire from the lower guideway 86, around the arcuate section 89 and up onto the upper guideway 111 and to move now empty reels from the upper guideway 111 to the lower guideway 86. A second dog (see FIG. 10) 269 on the conveyer 72 trips and reactuates the limit switch 212 (see FIG. 5A) to open a pair of normally closed contacts 212–1 to de-energize the relay 241.

The de-energization of the relay 241 opens the contacts 241–1 to de-energize the relay 242 whereupon contacts 242–1 open to de-energize the clutch 92 and contacts 242–2 close to energize the brake 93. The movement of the conveyer 72 is halted and the operator operates the selector switch 257 to the EXTEND position to energize the coil of the latching relay 258 and release the contacts 258–1, 258–2 and 258–3. When the contacts 258–1, 258–2 and 258–3 are released, the reel clamp solenoids 261 to 263, inclusive, are de-energized to operate the air cylinders 134 to move the support cones 133 into the hub portions 22 of the full reels 21 (see FIGS. 4 and 6), and lift the reels of wire transversely of and off the upper guideway 111 to the horizontal payoff positions. The limit switch 266 is deactuated to disable the circuit through the relay 241 whereafter the operator turns the selector switch 222 to the TIMED STOP position, or alternatively, depresses the conveyer energization stop pushbutton 224 to de-energize the conveyer motor 91.

Unloading operation

After the wire has been payed off from the reels 21 in the payoff stations along the upper guideway 111 and after the empty reels are transferred to the lower guideway 86 and another set of full reels have been moved off the conveyer 72 into the payoff positions, the operator employs the conveyer to unload the empty reels, now on the lower guideway, from the payoff stand 20. This is possible since the conveyer 72 is not in engagement with the reels of wire during payoff.

Accordingly, the operator sets the selector switch 201 to an UNLOAD position. The contacts 201–2 are closed to enable a circuit for the reversing motor starter 223 in a second direction opposite to the first direction of movement initiated by the forward motor starter 225 and the contacts 201–6 are closed to energize a relay 271. The energization of the relay 271 closes the relay contacts 271–1, 271–2, 271–3. 271–4. 271–5 and 271–6 to enable a plurality of unloading sequence circuits. The operator then turns the selector switch 222 to a CYCLE START position.

When the switch 201 is moved to the UNLOAD position, a circuit is completed through the pushbutton switch 224, selector switch contacts 222–2 and 222–1, selector switch contacts 201–2, a pair of contacts 272–1 of a limit switch 272 (see FIG. 10) through an unload safety switch 273 and through the motor starter 223 and then through overload contacts 228 and 229 to energize the reversing motor starter 223 for operating the motor 91 to turn the conveyer 72 in a second or counterclockwise direction. When the forward direction motor starter 225 is energized, motor starter contacts are closed to start up the conveyer motor 91 whereupon interlock contacts open to lock out the contacts of the reversing motor starter 223. The forward motor starter control contacts 225–1 are closed to energize the time delay relay 232 and illuminate the motor running indicator light 234.

Then, when the time delay relay 232 is energized, instantaneous contacts 232–1 are closed to provide a holding circuit through pushbutton switch 224, selector switch contacts 222–2, time delay relay contacts 232–1, selector switch contacts 201–2, limit switch 272, limit switch 273, reversing motor starter 223 and through interlock contacts 228 and 229 to provide a holding circuit for the forward direction motor starter 225. Moreover, the time delay relay contacts 232–2 are closed to energize the relay 241 through a circuit completed through contacts 271–1, contacts 213–2, time delay relay contacts 218–1, limit switch contacts 272–2, contacts 238–1 of the gates closed limit switch 238, time delay relay contacts 232–2 and the limit switch 239. Also, the relay contacts 241–1 are closed to energize the relay 242. It will be recalled that the relay contacts 241–2 function only during the transfer operation of the reels from the lower guideway 86 to the upper guideway 111. Then the instantaneous time delay relay contacts 232–3 open to disable the torque tensioning circuit.

When the relay 242 is energized, the conveyer brake 93 is released and the clutch 92 is engaged whereupon the conveyer 72 moves reels 21, now empty, in a second counterclockwise direction from the lower guideway 86 toward the unloading station 26 until a leading one of the reels breaks a light beam of the reel detector photoelectric unit 217 (see FIG. 10). When the beam of light from the reel detector photoelectric unit 217 is broken, the relay 237 is de-energized to close normally closed contacts 237–1, now open, and to energize the relay 213 by a circuit completed through the contacts 237–1 and the contacts 271–4.

The energization of the relay 213 closes relay contacts 213–1 which are by-passed by the unload limit switch 272 (see FIG. 10), which is normally closed. The relay contacts 213–3 are closed, but function only in the loading sequence for the reels 21; however, the relay contacts 213–2 are opened to disable the by-pass circuit around the time stop limit switch 247. Also, when the relay 213 is energized, the relay contacts 213–4 are closed to provide a holding circuit through relay contacts 271–3, relay contacts 213–4, and through time delay relay contacts 218–4 and then through relay contacts 271–4 for relay 213. Simultaneously, relay contacts 213–5 are closed to enable a circuit for energization of the solenoid winding 214 which extends the blade 44 in toward the conveyer 72. Additionally, the relay contacts 213–7 are closed to enable a circuit for the solenoid 221 which actuates the air cylinders 69 to open and close the gate 54.

When the conveyer timing cam 243 is turned to a dwell position, the limit switches 247 and 219 are deactuated.

Limit switch contacts 247–1 are operated, but function only when the manual time stop is required. Also, contacts 247–2, normally open, now closed, reopen to de-energize the relay 241 whereupon the relay contacts 241–1 are opened to de-energize the relay 242. The de-energization of the relay 242 stops the conveyer 72 as the brake 93 is operated and the clutch 92 is released. At the same time, contacts 219–1 are operated, but function only in the loading of the reels 21 onto the payoff stand 20. Simultaneously, when the cam timer 243 reaches the dwell, the relay contacts 219–2 are closed to energize the plate extend solenoid 214 through a now-completed circuit through relay contacts 271–5, relay contacts 213–5 and normally closed contacts 219–2.

When the solenoid 214 is energized, the blade 44 is extended under the still closed gate 54 in toward the conveyer 72 and between the flanges 23 of the empty reel and a lug 71 of the conveyer 72 and a horizontally aligned lug 104 of the conveyer 101. The blade 44 actuates the limit switch 216 (see FIG. 2) to close a pair of contacts 216–1, normally closed, but which function during the loading sequence only. Also, a pair of contacts 216–2 are closed to energize the coil of the solenoid 221 through a circuit through relay contacts 271–6 and relay contacts 213–8, normally open, and now closed. Moreover, as the blade 44 is moved in toward the conveyer 72, the limit switch 239 is deactuated to disable the circuit for the relay 241.

When the coil of the solenoid 221 is energized, the cover sections 56 of the gate 54 are moved slidably along the guide rods 57 and 58 away from each other to open the gate. The gate 54 no longer holds the blade 44 in a first position inclined toward the carrier bar 42 and the spring 47 urges the blade to pivot to a second position inclined away from the carrier bar. As the blade 44 is moved pivotally, the blade kicks the empty reel 21, now in the unload position, out of engagement with the lugs 71 of the conveyer 72 and the lugs 104 of the auxiliary conveyer 101, whereupon an empty reel 21 rolls away from the conveyers and down the blade 44, now inclined, onto the receiving plate 36. The light beam of the conveyer detector 217 is no longer interrupted and the photoelectric relay 237 is energized to open the contacts 237–1, normaly closed. When the empty reel has rolled onto the receiving plate 36, a light beam of a reel discharge photoelectric detector 278 (see FIGS. 1 and 12B) is broken to energize the detector relay and close a pair of contacts 278–1, normally open, and thereupon energize the time delay relay 218 through a circuit through the relay contacts 271–2 and the photoelectric relay contacts 278–1.

The energization of the time delay relay 218 opens contacts 218–1 to disable a bypass circuit around the limit switch 247 and also operates the relay contacts 218–2 which function during the loading sequence only. Similarly, the contacts 218–3 are operated, but these also function during the loading sequence only. Also, when the time delay relay 218 is energized, the relay contacts 218–4 are opened to de-energize the relay 213. The relay contacts 218–5 and 218–6 are operated, but both function during the transfer sequence only.

The de-energization of the relay 213 closes the contacts 213–2 to enable the bypass circuit for the relay 241 and opens normally open, now closed, contacts 213–8 to de-energize the solenoid 221 whereupon the cover sections 56 are moved slidably along guide rods 57 and 58 to close the gate 54. Also, the contacts 213–6 are opened to de-energize the solenoid 214 to operate the air cylinder 53 and withdraw the blade 44 from the path of the conveyer 72.

After the operator removes the empty reel 21 from the receiving plate 36, the beam of light from the reel discharge detector 278 is restored to re-energize detector relay and open the normally open contacts 279–1 and de-energize the time delay relay 218. When the time delay relay 218 is de-energized, the relay contacts 218–1 are closed to enable the relay circuit through the relay 241, and to close the contacts 218–4 to enable a holding circuit for the relay 213. When the loading plate or blade 44 is fully retracted to the right, as viewed in FIG. 2, the relay 241 is again energized and the cycle is repeated for indexing the conveyer 72 in the second counterclockwise direction, as viewed in FIG. 2, to position the next succeeding empty reel 21 in registration with the unloading station 26 after which the blade 44 is again moved into and under the next succeeding reel.

Successive reels 21 are unloaded by repetition of the cycle hereinbefore described until the conveyer 72 has moved the last of the empty reels to the discharge position where the unload limit switch 272 (see FIG. 10) is actuated simultaneously with the actuation of limit switches 219 and 247 by a dog 251 on the conveyor whereupon contacts 272–1 and 272–2 are opened. The blade 44 is then moved slidably into and under the last of the empty reels and the cycle is repeated with the relay 213 de-energized to open the contacts 213–1 and de-energize the forward direction motor starter 225 to stop the conveyer motor 91. Moreover, when relay 213 is de-energized, contacts 213–2 are closed to enable a bypass circuit for the relay 241, contacts 213–8 are opened to de-energize the solenoid 221 to close the gate 54 and the contacts 213–6 are opened to de-energize the solenoid 214 to withdraw the blade 44.

The loading sequence circuits are disabled and the payoff apparatus 20 is in condition for another cycle of operation for the operator to place reels 21 of wire 19 onto the loading device 43 for movement onto the lower guideway 86 and for the subsequent transfer of the full reels to the upper guideway 111 and removal of the reels currently being payed off from the apparatus.

It is to be understood that the above-identified embodiments are simply illustrative of the principles of the invention and numerous other modifications may be devised without departing from the spirit and scope of the invention.

What is claimed is:

1. In a system for loading full flanged, cylindrical articles having first and second spaced, peripheral end sections into a plurality of work devices, wherein each work device includes a pair of opposed workholders and having facilities for slidably moving the workholders toward each other to engage the articles in registration with the work devices and for unloading empty articles therefrom, the improvement which comprises:

upper track means extending between said work devices normally supporting the articles in a tilted position for supporting the full articles in alignment with said workholders;

lower track means for supporting said articles along said peripheral end sections;

a vertically extending arcuate guide plate aligned with the upper track means and extending toward the lower track means to guide the articles from the lower track means to the upper track means;

load-unload means biased in a first inclined position for rolling empty articles away from said arcuate guide plate and for yielding under the weight of a full article to roll the full article into engagement with said arcuate guide plate;

means engaging and exerting a pushing force to the first and second peripheral end sections for rolling the full articles from said load-unload means in a first direction along the lower and then the upper track means around said arcuate guide plate and for moving the empty reels in said first direction around said arcuate guide plate to said lower track means and then in a second direction around said arcuate guide plate to said load-unload means; and means rendered effective upon movement of said full articles in a first direction into registration with said work devices for operating said sliding facilities to engage the workholders with the articles and support the articles above the upper track means and out of engagement with said pushing means.

2. A system for loading reels having opposed hollow hub portions into a plurality of evenly spaced payoff devices, wherein each payoff device includes a pair of opposed cones and facilities for sliding the cones relative to each other to engage within hubs of reels positioned between the cones, the improvement which comprises:

a first track extending between said payoff devices for supporting said reels with the center lines of first hub portions beneath the level of the cones;

a second track extending between said supply stands for supporting said reels in tilted position with the center lines of the second hub portions in alignment with the level of the cones;

means for moving the reels along said tracks to position a reel in each of said payoff devices;

means rendered effective upon movement of said reels into said payoff devices for operating the sliding facilities to move said cones to engage opposite hub portions of said reels, whereupon the hub portions positioned oved the second track move onto said cones associated with the second track; and cam means on said first track for engaging and elevating the hub portions positioned over the first track to position said hubs to receive the cones associated with the first track.

3. In a payoff stand for loading reels of wire having opposed, hollow hub portions and first and second spaced peripheral end sections into a plurality of evenly spaced payoff devices, wherein each payoff device includes a pair of opposed cones and having facilities for slidably moving the cones toward each other to engage within the hollow hub portions of reels positioned between the cones and for unloading empty reels therefrom, the improvement which comprises:

an upper track having a first rail extending between said payoff devices for supporting the reels with the center lines of said first peripheral end section beneath the level of the cones and a second rail extending between said payoff devices for supporting said reels in a tilted position with the center lines of the second peripheral end sections in alignment with the level of the cones, said first rail having a beveled camming strip mounted thereon;

means for engaging and exerting a pushing force to said first peripheral end section to roll said tilted reels along said first and second rails;

a lower track having a pair of spaced apart rails for supporting the reels along the peripheral end sections thereof;

a vertically extending arcuate guide plate aligned with the upper track and extending toward the lower track to guide the reels from the upper track to the lower track;

means rendered effective upon movement of said reels into registration with said payoff devices for operating said sliding facilities to move said first peripheral end section over said camming strip and support said reel on said cones above said upper track and offset laterally therefrom;

normally inclined means slidably movable between said peripheral end sections and said engaging and pushing means for rolling said empty reels away from said arcuate guide plate;

slide means having facilities for pivotally mounting said rolling means; and means normally urging said rolling means to a position inclined away from said slide means for yielding under the weight of a reel of wire to move pivotally said rolling means to a position inclined toward said slide means to roll said loaded reel down said loading means into engagement with said pushing means.

4. In a system for advancing cylindrical articles:

a first track member for engaging and supporting first peripheral end sections of the articles at a first elevation;

a second track spaced from the first track member for engaging and supporting second peripheral end sections of the articles at second elevation which is higher than said first elevation, to maintain said articles in tilted positions; and means for engaging and exerting a pushing force to said first peripheral end sections to roll said tilted articles along said first and second track members.

5. In a system as defined in claim 4 wherein the articles to be advanced include a pair of flanges;

means for shifting said articles transversely of said tracks; and camming means on said first track for engaging first ones of said flanges and elevating said first peripheral ends of said articles to the same elevation as said second peripheral ends.

6. In a system for advancing cylindrical articles having first and second spaced peripheral end sections along a first guideway and then around an arcuate extension thereof to a second guideway aligned with and spaced above said first guideway;

means for engaging and exerting a pushing force to said first peripheral end sections to roll said articles along said first and second guideways; and means positioned at opposite ends of said first guideway for engaging and exerting a pushing force against said second peripheral end sections to transfer said articles from said first guideway to said second guideway.

7. In a system for advancing flanged reels of wire along a lower guideway and then around a vertically extending arcuate guide plate to an upper guideway aligned with and spaced above said lower guideway;

a first endless chain;

a plurality of pairs of first lugs spaced along said first chain to engage a pair of said first lugs with spaced, opposed chordal points on one of the flanges of each of said reels;

means for advancing said first endless chain to exert a pushing force to said reels to move said reels along said lower and upper guideway, and said guide plate;

a second endless chain positioned at each end of said lower guideway; and a plurality of pairs of second lugs on each of said second chains for engaging a pair of said second lugs with the other flange of each of said reels to advance said reel around said arcuate guide plate.

8. In an apparatus for loading full reels and unloading empty reels from a payoff stand, said reels having first and second flanged peripheral ends;

an upper trackway for supporting said reels;

a lower trackway for supporting said reels;

a vertically extending arcuate guide plate having one end aligned with said upper trackway and a lower end spaced above said lower trackway a distance to receive reels between the lower end and the lower trackway;

a normally closed loading gate for confining said reels between said arcuate guide plate and said gate as said reels are moved therearound;

first endless conveying means adjacent said upper trackway and spaced from said lower trackway and having spaced pairs of lugs for engaging the first peripheral ends of said reels to move said reels on said trackways and around said guide plates;

second endless conveying means having spaced pairs of lugs aligned with the lugs on said first conveying means for engaging the second peripheral ends of said reels to assist said first conveying means to move said reels around said arcuate guide plates; and means mounting said first and second conveying means for guiding said lugs between said arcuate guide plate and said gate to support said reels on said lugs as the reels are freely moved around said guide plate and prevent the reel from binding against the plate and the gate.

9. In an apparatus for loading full reels and unloading empty reels from a payoff stand;
- a carrier means mounted for movement between a first reel load position and a second reel unload position;
- a reel guide pivotally mounted of said carrier means; and
- resilient means interposed between said reel guide and said carrier means for supporting the reel guide in a first inclined position upon placing a full reel on the guide at the load position and for urging the reel guide in a second upwardly inclined position upon placing an empty reel on said guide at the unload position.

10. In a system for loading full reels of wire and unloading empty reels to and from a payoff stand having an upper trackway and a lower trackway joined by an arcuate end trackway together with means for advancing the reels along the trackways, the improvement which comprises:
- a deflectable guide plate for receiving full and empty reels;
- means for sliding the plate into the path defined by the arcuate end trackway, to load full reels and unload empty reels; and
- means for resiliently supporting said guide plate in a first inclined position to intercept and roll the empty reels from said arcuate end trackway and for supporting said guide plate in a second inclined position to roll the full reels onto said arcuate end trackway.

11. In an apparatus for loading reels of wire onto a conveyer and for unloading empty reels from said conveyer;
- a vertically extending arcuate guide plate;
- means for advancing the conveyer around said arcuate guide plate;
- a transfer plate extending toward said conveyer for guiding said reels toward and away from said conveyer;
- a horizontal slide means having facilities for pivotally mounting said transfer plate;
- means engaging and normally urging said transfer plate to a position inclined away from said slide means for yielding under the weight of a reel of wire to support the transfer plate in a position inclined toward said slide means to roll the reel of wire into engagement with said arcuate guide plate and said conveyer;
- means for advancing said slide means toward the conveyer to position the transfer plate in the path of said conveyer;
- a normally closed gate for restraining the movement of said reels along the inclined transfer plate and for holding said transfer plate in a position inclined toward said slide means; and
- means rendered effective upon advancing said slide means for opening said gate to roll the reels of wire along the inclined transfer plate toward said conveyer and to release the transfer plate to be urged to said position inclined away from said slide means to roll the empty reels from the conveyer through the gate.

12. In an apparatus for unloading empty reels of wire from a conveyer;
- a vertically extending arcuate guide plate;
- means for advancing the conveyer around said arcuate guide plate;
- an unloading plate extending toward said conveyer for receiving said empty reels of wire;
- a horizontal slide means having facilities for pivotally mounting said unloading plate;
- means engaging said unloading plate for normally urging said unloading plate inclined away from said slide means;
- means for advancing said slide means toward the conveyer to position the unloading plate in the path of said conveyer;
- a normally closed gate for restraining the movement of said empty reels downwardly along said unloading plate and for holding said unloading plate in a position inclined toward said slide means; and
- means rendered effective upon the advance of said slide means for opening said gate to allow said urging means to pivotally move said unloading plate away from said slide means and roll the empty reel down the inclined plate away from the arcuate guide plate and off said conveyer.

13. In an apparatus for loading a reel of wire onto a conveyer;
- a vertically extending arcuate guide plate;
- means for advancing the conveyer around said arcuate guide plate;
- a loading plate extending toward said conveyer for receiving a reel of wire;
- a horizontal slide means having facilities for pivotally mounting said loading plate;
- a spring engaging and holding said loading plate in position inclined away from the slide, said spring being depressed upon loading of a reel of wire to move said loading plate to a position inclined toward the slide;
- means for advancing said slide toward the conveyer to position the loading plate in the path of said conveyer;
- a normally closed gate for restraining movement of the reel with the loading plate; and
- means rendered effective upon said slide being advanced for opening said gate to roll the reel down the inclined plate against the arcuate plate and into the path of said conveyer.

14. In an apparatus for advancing empty reels from a plurality of payoff positions along an upper guideway around a vertically extending arcuate guide plate to a lower guideway and for then unloading said reels at an unload position from said apparatus;
- a first endless chain;
- a plurality of pairs of first lugs spaced along said first chain to engage spaced chordal portions on one of the flanges of each of said reels;
- means for advancing said first endless chain to exert a pushing force to said reels to move said reels in a first direction along said upper guideway around said arcuate guide plate and along said lower guideway;
- a second endless chain positioned at each end of said lower guideway;
- a plurality of pairs of second lugs on each of said second chains for engaging the other flange of each of said reels to advance said reel around said arcuate guide plate;
- means for advancing said first and second endless chains in a second direction to move a leading one of said empty reels along said lower guideway and around said arcuate guide plate to said unload position;
- an unloading plate extending toward said endless chains for receiving said empty reels of wire;
- a horizontal slide means having facilities for pivotally mounting said unloading plate;
- means for advancing said slide means toward the endless chains to position the unloading plate between said flanges of a reel in said unload position and said first and second lugs;
- means engaging said unloading plate for normally urging said unloading plate inclined away from said slide means;

a normally closed gate for guiding said empty reels along said arcuate guide plate and for holding said unloading plate in a position inclined toward said slide means; and means rendered effective upon the advance of said slide means for opening the gate to release the unloading plate to move pivotally away from the slide and lift the reel off the lugs to roll the reel down the unloading plate away from the arcuate guide plate.

15. In an apparatus for removing empty flanged reels from a payoff stand at an unload position;

a vertically extending arcuate guide plate;

conveying means having spaced pairs of lugs for engaging the flanges of the reels to move the reels along the payoff stand around the arcuate guide plate to the unload position;

means pivotally mounted and positioned in a first inclined position between the flanges and a lowermost lug of each pair of lugs in engagement with each of said flanges for guiding the empty reels from said conveying means;

means for slidably mounting said guide means;

a normally closed gate for guiding the empty reels around the arcuate guide plate and for holding the guide means in said first inclined position;

means for slidably moving said guide means out of engagement with said lugs;

means responsive to the withdrawal of said guide means for opening said gate; and means rendered effective by the opening of said gate for urging said guide means in a second inclined position to roll said empty reels away from said conveying means and along said guide means.

16. In a system for advancing each of a plurality of reels of wire having first and second peripheral end sections on a track to each of a plurality of payoff positions, the improvement which comprises:

conveying means for engaging and exerting a pushing force to said first peripheral end section of said reels to roll said reels along said track;

means slidably movable into engagement with said conveying means for transferring said reels of wire to said conveying means;

means normally urging said transferring means into a first inclined position for yielding under the weight of a reel of wire to suppor said transferring means in a second inclined position to roll said reels down said transferring means into engagement with said conveying means;

a normally closed gate for restraining movement of said reels along said transferring means and for holding said transferring means in said second inclined position, and means rendered effective upon said transferring means being moved slidably into engagement with said conveying means for opening said gate to permit a reel of wire which has been placed on said transferring means to roll along said transferring means into engagement with said conveying means.

17. In an apparatus for loading full reels and unloading empty reels from a payoff stand, said reels having first and second flanged peripheral ends;

a carrier means mounted for movement between a first reel load position and a second reel unload position;

a reel transfer plate pivotally mounted of said carrier means and having a tapered end;

a vertically extending arcuate guide plate;

first conveying means having spaced pairs of lugs for engaging the first peripheral ends of said reels to move said reels on said payoff stand and around said arcuate guide plate;

second conveying means positioned at each end of said payoff stand and having spaced pairs of lugs for engaging the second peripheral ends of said reels to assist said first conveying means in moving said reels around said arcuate guide plate;

a normally closed gate for supporting said reels against said arcuate guide plate as said conveying means move the reel around the arcuate guide plate, said gate having a slot formed therein for receiving said guide plate;

means responsive to an empty reel conveyed to said unload position for moving said carrier means to advance said guide plate through said slot and push said tapered end of said transfer plate over said lugs and under said flanges of said reels and for then withdrawing said transfer plate;

means responsive to the withdrawal of said transfer plate for opening said gate; and means rendered effective by the opening of said gate for urging said transfer plate to a second inclined position to roll said empty reel along said transfer plate away from said conveying means.

18. In a wire payoff system for advancing flanged reels of wire along a lower guideway and then around a vertically extending arcuate guide plate to spaced rails of an upper guideway aligned with and spaced above said lower guideway and into registration with a plurality of payoff devices;

a first endless chain;

a plurality of pairs of first lugs spaced along first said chain to engage a pair of said first lugs with spaced, opposed chordal points on one of the flanges of each of said reels;

means for advancing said first endless chain to exert a pushing force to said reels to move said reels along said lower and upper guideway;

a second endless chain positioned at each end of said lower guideway;

a plurality of pairs of second lugs on each of said second chains for engaging a pair of said second lugs with the other flange of each of said reels to advance said reel around said arcuate guide plate;

means for controlling the tension of the wire payed off from said reels; and means positioned between said spaced rails on said upper guideway and below each of said payoff devices for guiding said wire from said reels and for actuating said controlling means.

19. In a system for loading full flanged, cylindrical articles having first and second spaced, peripheral end sections into a plurality of work devices, wherein each work device includes a pair of opposed workholders and having facilities for slidably moving the workholders toward each other to engage the articles in registration with the work devices and for unloading empty articles therefrom, the improvement which comprises:

upper track means extending between said work devices normally supporting the articles in a tilted position for supporting the full articles in alignment with said workholders;

lower track means for supporting said articles along said peripheral end sections;

means aligned with the upper track means and the lower track means for moving the articles from the lower track means to the upper track means and from the upper track means to the lower track means;

load-unload means biased in a first inclined position for rolling empty articles away from said moving means and for yielding under the weight of a full article to roll the full article into engagement with said moving means;

means engaging and exerting a pushing force to said first and second peripheral end sections for rolling the full articles from said load-unload means in a first direction along the lower and along the upper track means to said work devices and for moving the empty reels in said first direction along said upper track means to said lower track means and then in a second direction to said load-unload means, and means rendered effective upon movement of the full articles in a first direction into direction with said work devices for operating said sliding facilities to engage the workholders with the articles and support the articles above the upper track means and out of engagement with said pushing means.

20. In a system for loading full flanged, cylindrical articles having first and second spaced, peripheral end sections into a plurality of work devices, wherein each work device includes a pair of opposed workholders and having facilities for slidably moving the workholders toward each other to engage the articles in registration with the work devices and for unloading empty articles therefrom, the improvement which comprises:

upper track means extending between said work devices normally supporting the articles in a tilted position for supporting the full articles in alignment wtih said workholders;

lower track means for supporting said articles along said peripheral end sections;

means aligned with the upper track means and the lower track means for guiding the articles from the lower track means to the upper track means;

load-unload means biased in a first inclined position for rolling empty articles away from said arcuate guide plate and for yielding under the weight of a full article to roll the full article into engagement with said guide plate;

means engaging and exerting a pushing force to the first and second peripheral end sections for rolling the full articles from said load-unload means in a first direction along the lower and then the upper track means and around said guiding means and for moving the empty reels in said first direction around said guiding means to said lower track means and then in a second direction around said guiding means to said load-unload means, and means rendered effective upon movement of the full articles in a first direction into registration with said work devices for operating said sliding facilities to engage the workholders with the articles and support the articles above the upper track means and out of engagement with said pushing means.

21. In a system for advancing articles having first and second spaced peripheral end sections along a first guideway and then along a second guideway aligned with and spaced above said first guideway:

means for engaging and exerting a pushing force to said first peripheral end sections to roll said articles along said first and second guideway, and means positioned at opposite ends of said first guideway for engaging said first and second peripheral end sections to transfer articles from said first guideway to said second guideway and from said second guideway to said first guideway.

22. In a system for advancing flanged reels of wire along a lower guideway and then around a vertically extending arcuate guide plate to an upper guideway aligned with and spaced above said lower guideway:

a first endless chain;

a plurality of first lugs spaced along said first chain for engaging one of the flanges of each of said reels;

means for advancing said first endless chain to exert a pushing force to said reels to move said reels along said lower and upper guideway and said guide plate;

a second endless chain positioned at each end of said lower guideway, and a plurality of second lugs on each of said second chains for engaging the other flange of each of said reels to advance said reels around said arcuate guide plate.

References Cited

UNITED STATES PATENTS

| 1,662,803 | 3/1928 | Frelinghuysen | 198—174 X |
| 2,277,039 | 3/1942 | De L. Sinden | 198—174 |
| 2,332,005 | 10/1943 | Nystrom et al. | 242—131 |
| 2,861,672 | 11/1958 | Buhrer et al. | 198—85 |
| 2,868,467 | 1/1959 | Lewis | 242—25 |
| 2,955,770 | 10/1960 | Ensor | 242—25 |

NATHAN L. MINTZ, Primary Examiner.

U.S. Cl. X.R.

198—174